(12) United States Patent
Ishii

(10) Patent No.: US 10,719,922 B2
(45) Date of Patent: Jul. 21, 2020

(54) IMAGE PROCESSING APPARATUS

(71) Applicant: CANON KABUSHIKI KAISHA, Tokyo (JP)

(72) Inventor: Shinya Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 15/682,378

(22) Filed: Aug. 21, 2017

(65) Prior Publication Data

US 2018/0061025 A1    Mar. 1, 2018

(30) Foreign Application Priority Data

Aug. 30, 2016 (JP) ................................. 2016-168274
Jun. 20, 2017 (JP) ................................. 2017-120174

(51) Int. Cl.
  *G06T 5/00* (2006.01)
  *G06T 5/40* (2006.01)

(52) U.S. Cl.
  CPC ................ *G06T 5/009* (2013.01); *G06T 5/40* (2013.01); *G06T 2207/10024* (2013.01)

(58) Field of Classification Search
  CPC .. G06T 5/009; G06T 5/40; G06T 2207/10024
  See application file for complete search history.

(56) References Cited

U.S. PATENT DOCUMENTS

| 9,661,294 B2* | 5/2017 | Oh ...................... H04N 9/8722 |
| 2003/0112257 A1* | 6/2003 | Tamura .................... G09G 3/20 |
| | | 345/690 |
| 2008/0231581 A1* | 9/2008 | Fujine .................. G09G 3/3406 |
| | | 345/98 |
| 2009/0041375 A1* | 2/2009 | Cohen ..................... G06T 5/007 |
| | | 382/274 |
| 2010/0053682 A1* | 3/2010 | Gotoh ................ H04N 1/00411 |
| | | 358/1.15 |
| 2010/0277620 A1* | 11/2010 | Iijima ................ H04N 5/23232 |
| | | 348/240.1 |

(Continued)

FOREIGN PATENT DOCUMENTS

| JP | 2000-287955 A | 10/2000 |
| JP | 2002-281271 A | 9/2002 |

(Continued)

*Primary Examiner* — Kent W Chang
*Assistant Examiner* — Nathaniel P Brittingham
(74) *Attorney, Agent, or Firm* — Canon U.S.A., Inc. I.P. Division

(57) ABSTRACT

An image processing apparatus includes a setting unit configured to set at least one of a plurality of display modes including a first display mode and a second display mode, and a processing unit configured to perform first gradation conversion processing on input image data when the first display mode is set, and to perform second gradation conversion processing on the input image data when the second display mode is set, wherein the second gradation conversion processing improves a gradation of a part of a gradation range of the input image data to a further extent than the first gradation conversion processing. Upon reception of an instruction for displaying an enlarged image of a part of an image region of the input image data in a state where the first display mode is set, the first display mode is canceled and the second display mode is set.

15 Claims, 17 Drawing Sheets

(56) References Cited

U.S. PATENT DOCUMENTS

| | | | |
|---|---|---|---|
| 2010/0322509 A1* | 12/2010 | Shimizu | G06T 5/002 382/162 |
| 2012/0274825 A1 | 11/2012 | Oogami | |
| 2014/0092012 A1* | 4/2014 | Seshadrinathan | G06T 5/007 345/157 |
| 2015/0002552 A1* | 1/2015 | Takagi | G09G 3/2003 345/690 |
| 2015/0142884 A1* | 5/2015 | Veramendi | G06F 16/51 709/204 |
| 2015/0348247 A1* | 12/2015 | McLaughlin | G06T 5/40 382/131 |
| 2015/0356904 A1* | 12/2015 | Nakatani | G09G 5/377 345/690 |
| 2017/0293205 A1* | 10/2017 | Iwata | H04N 1/00458 |
| 2018/0061025 A1* | 3/2018 | Ishii | G06T 5/40 |
| 2018/0241979 A1* | 8/2018 | Kanda | H04N 9/68 |
| 2018/0336849 A1* | 11/2018 | Ishii | G09G 3/3413 |
| 2018/0358048 A1* | 12/2018 | Uchimura | H04N 9/8205 |
| 2019/0086725 A1* | 3/2019 | Ishii | G02F 1/133602 |

FOREIGN PATENT DOCUMENTS

| | | |
|---|---|---|
| JP | 2006-325243 A | 11/2006 |
| JP | 2007-259303 A | 10/2007 |
| JP | 2009-100171 A | 5/2009 |
| JP | 2011-059193 A | 3/2011 |
| WO | 2015/184300 A1 | 12/2015 |

\* cited by examiner

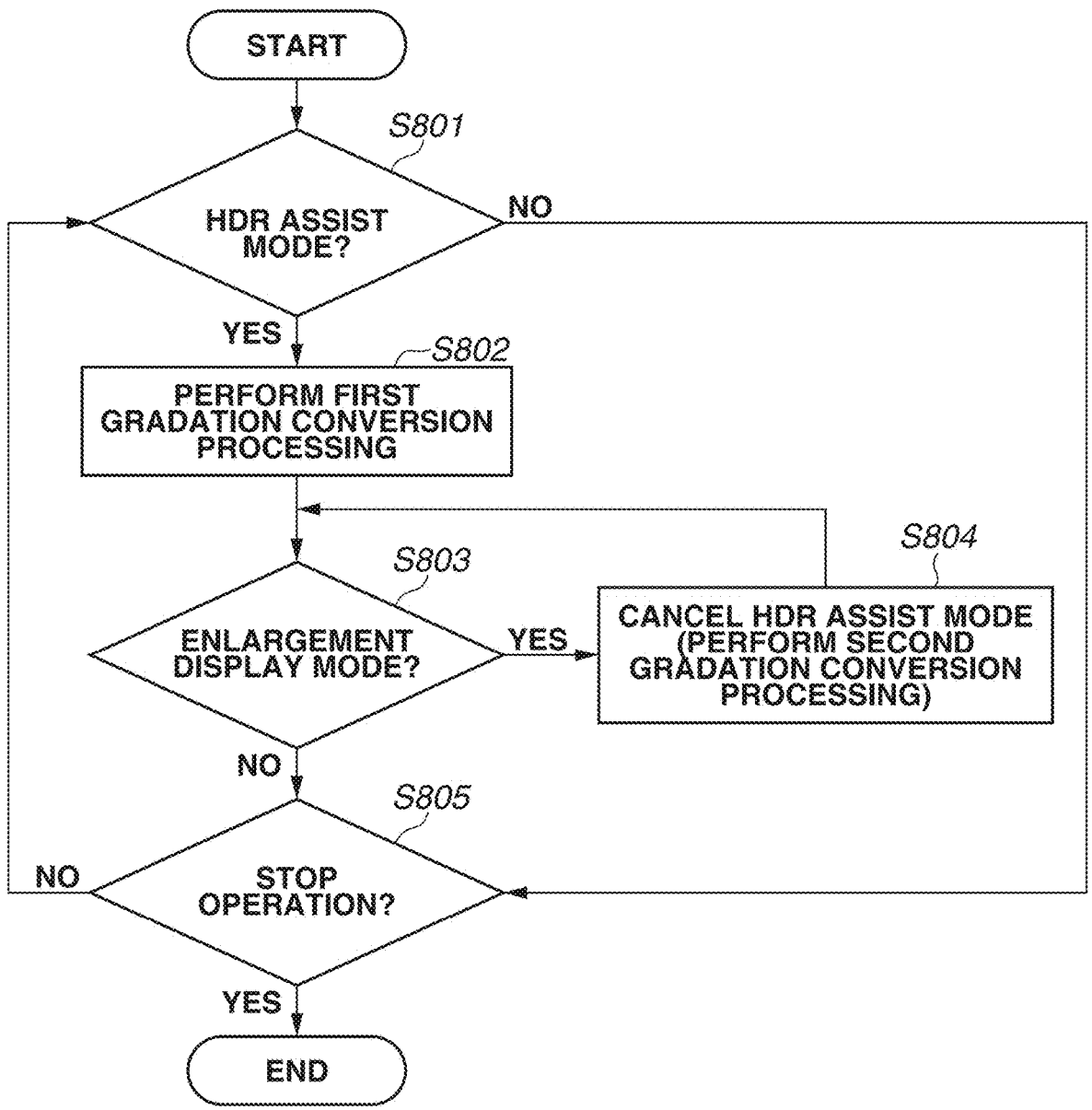

IMAGE PROCESSING APPARATUS

BACKGROUND OF THE INVENTION

Field of the Invention

The present invention relates to an image processing apparatus for performing gradation conversion processing on input image data, and an image processing method.

Description of the Related Art

Recent years have seen an increasing number of imaging apparatuses capable of generating captured image data (image data representing an image of a subject) having a wide dynamic range through image capturing. A wide dynamic range is referred to as "High Dynamic Range (HDR)", and image data having an HDR is referred to as "HDR image data". There has been an increasing number of occasions where HDR image data is assumed to be used at sites of image production and sites of development of apparatuses (including image processing apparatuses and display apparatuses).

To display an image faithful to the HDR image data, a high-precision display apparatus is required, in particular, a display apparatus having a high upper limit of the display luminance (on-screen luminance), capable of displaying a high-contrast display image (an image displayed on the screen), and capable of displaying a display image having a wide dynamic range. A display apparatus capable of displaying an image faithful to the HDR image data is hereinafter referred to as an "HDR display apparatus". For example, a display apparatus having a maximum display luminance of 1,000 nits (=1,000 $cd/m^2$) or higher and a minimum display luminance of 0.03 nits or lower may be defined as an HDR display apparatus. A liquid crystal display apparatus having a maximum display luminance of 1,000 nits or higher and a minimum display luminance of 0.05 nits or lower may also be defined as an HDR display apparatus. A light emission type display apparatus (organic electro-luminescence (EL) display apparatus) having a maximum display luminance of 540 nits or higher and a minimum display luminance of 0.0005 nits or lower may also be defined as an HDR display apparatus.

However, an HDR display apparatus is not always used at diverse sites. For example, at a photographing site, a non-HDR display apparatus is used because of restrictions on power sources and restrictions on carrying articles. Non-HDR display apparatuses include Standard Dynamic Range (SDR) display apparatuses other than HDR display apparatuses and HDR display apparatuses having limited display capabilities. A non-HDR display apparatus is, in particular, a display apparatus having a narrow dynamic range of the display luminance and a low upper limit of the display luminance. The non-HDR display apparatus cannot display an image faithful to the HDR image data. A liquid crystal display apparatus or a light emission type display apparatus having a maximum display luminance of 100 nits or lower may also be defined as a non-HDR display apparatus. A liquid crystal display apparatus or a light emission type display apparatus having a maximum display luminance of 500 nits or lower may also be defined as a non-HDR display apparatus.

For this reason, the non-HDR display apparatus may display an image based on the correspondence relation illustrated in FIG. 4A (HDR assist display) to allow a user to confirm the gradation of the HDR image data. In the correspondence relation illustrated in FIG. 4A (correspondence relation between the gradation value of the HDR image data and the display luminance of a non-HDR display apparatus), the display luminance of the non-HDR display apparatus linearly increases from the lower limit to the upper limit with increasing gradation value of the HDR image data (from the lower limit to the upper limit).

A display apparatus at a photographing site may display an enlarged image of a part of the image region of captured image data (enlargement display) to allow the user to easily (highly accurately) perform focus confirmation. A technique related to enlargement display is discussed, for example, in Japanese Patent Application Laid-Open No. 2006-325243. The technique discussed in this document performs electronic image stabilization on an image region subjected to enlargement display (the above-described part of the image region, i.e., enlargement region). This makes it easier for the user to perform focus confirmation.

However, preferable display (display desirable for focus confirmation) may not be obtained even by using the technique discussed in Japanese Patent Application Laid-Open No. 2006-325243. For example, when the technique discussed in Japanese Patent Application Laid-Open No. 2006-325243 is used, a display combining the above-described HDR assist display with the above-described enlargement display may be performed. When such display is performed, an entirely dark image may be displayed. More specifically, according to the correspondence relation illustrated in FIG. 4A, when each gradation value (gradation value of the HDR image data) in the enlargement region is small, display is performed with a display luminance with which each gradation value is low in the enlargement region. In the case of an entirely dark image, the user cannot easily perform focus confirmation. Japanese Patent Application Laid-Open No. 2006-325243 does not discuss such problems (an entirely dark image is displayed, focus confirmation cannot be easily performed, etc.).

SUMMARY OF THE INVENTION

According to an aspect of the present invention, an image processing apparatus includes a setting unit configured to set at least one of a plurality of display modes including a first display mode and a second display mode, and a processing unit configured to perform first gradation conversion processing on input image data when the first display mode is set, and to perform second gradation conversion processing on the input image data when the second display mode is set, wherein the second gradation conversion processing improves a gradation of a part of a gradation range of the input image data to a further extent than the first gradation conversion processing wherein, upon reception of an instruction for displaying an enlarged image of a part of an image region of the input image data in a state where the first display mode is set, the setting unit cancels the first display mode and sets the second display mode.

According to another aspect of the present invention, an image processing method includes setting at least one of a plurality of display modes including a first display mode and a second display mode, and performing first gradation conversion processing on input image data when the first display mode is set, and to perform second gradation conversion processing on the input image data when the second display mode is set, wherein the second gradation conversion processing improves a gradation of a part of a gradation range of the input image data to a further extent than the first gradation conversion processing, wherein, upon reception of an instruction for displaying an enlarged image of a part of an image region of the input image data in a state where the first display mode is set, the first display mode is cancelled and the second display mode is set.

According to yet another aspect of the present invention, a non-transitory computer-readable recording medium stores a program for causing a computer to execute each step of an image processing method. The image processing method includes setting at least one of a plurality of display modes including a first display mode and a second display mode, and performing first gradation conversion processing on input image data when the first display mode is set, and to perform second gradation conversion processing on the input image data when the second display mode is set, wherein the second gradation conversion processing improves a gradation of a part of a gradation range of the input image data to a further extent than the first gradation conversion processing, wherein, upon reception of an instruction for displaying an enlarged image of a part of an image region of the input image data in a state where the first display mode is set, the first display mode is canceled and the second display mode is set.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 8 is an example of a flowchart illustrating processing according to the first exemplary embodiment.

DESCRIPTION OF THE EMBODIMENTS

A first exemplary embodiment of the present invention will be described below centering on a case where an image processing apparatus according to the present exemplary embodiment is provided on an imaging apparatus (digital camera). The image processing apparatus according to the present exemplary embodiment may be an apparatus (a personal computer, a display apparatus, etc.) different from the imaging apparatus. Although, in the following example, the imaging apparatus has a display unit, the display unit may be a display apparatus different from the imaging apparatus. The display unit may be a display apparatus different from the image processing apparatus according to the present exemplary embodiment, and may be a display unit provided on the image processing apparatus according to the present exemplary embodiment. Although, in the following example, the display unit is a liquid crystal display unit having a back light module and a liquid crystal panel, the display unit is not limited to a liquid crystal display unit. For example, the display unit may be provided with a light emission unit and a display panel for displaying an image by penetrating light from the light emission unit. More specifically, a Micro Electro Mechanical System (MEMS) shutter system display unit using a MEMS shutter may be used as a display element. Alternatively, a light emission type display unit may be used. More specifically, an electro-luminescence (EL) display panel, a plasma display panel, etc. may be used.

Figure 1:
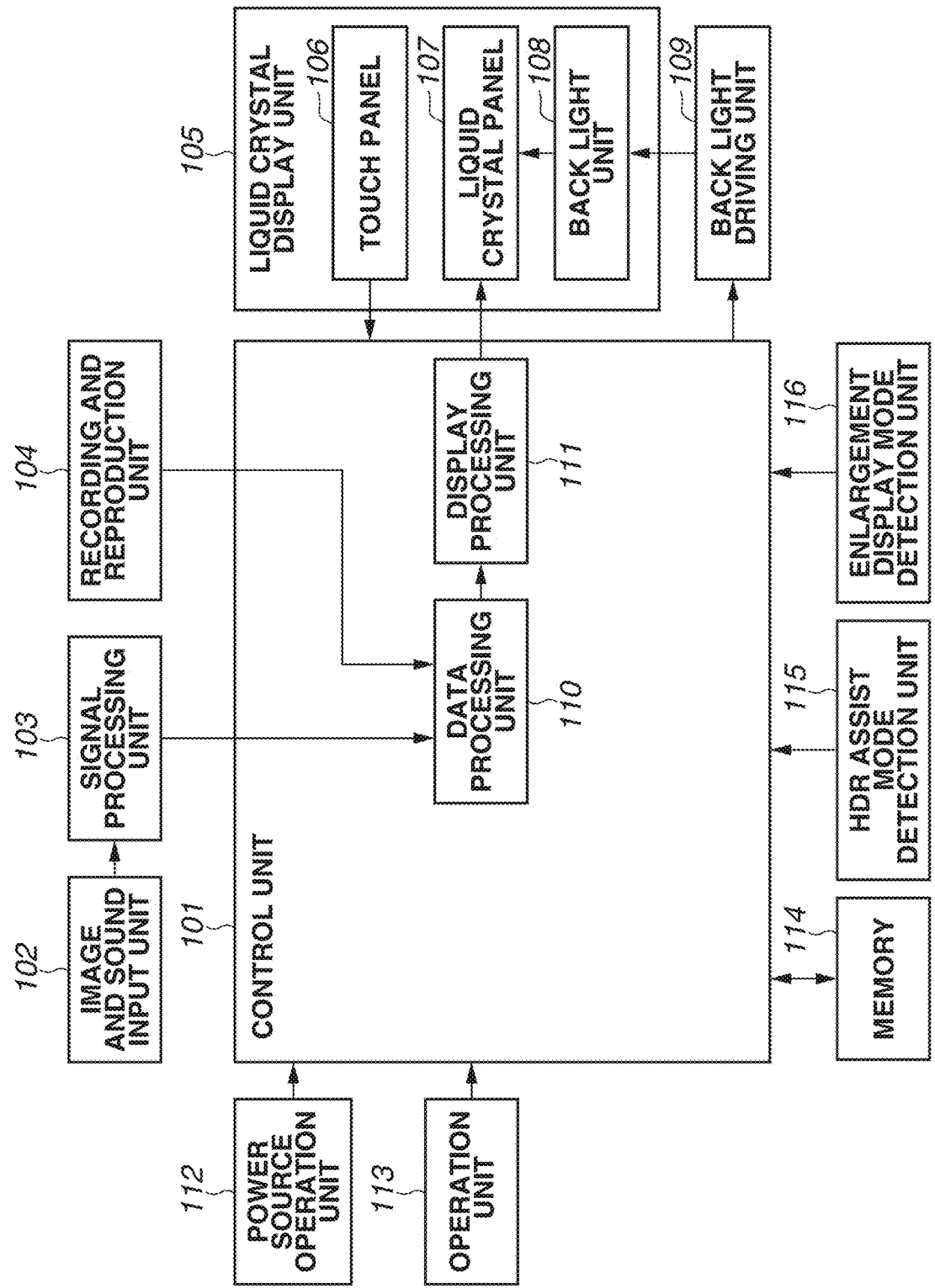
FIG. 1 illustrates an example of a configuration of an imaging apparatus according to a first exemplary embodiment.

The configuration of an imaging apparatus (digital camcorder) according to the present exemplary embodiment will be described below with reference to FIG. 1. FIG. 1 illustrates an example of a configuration of the imaging apparatus according to the present exemplary embodiment.

A control unit 101 performs various processing of the imaging apparatus. The control unit 101 is connected with a signal processing unit 103, a recording and reproduction unit 104, a liquid crystal display unit 105, a back light driving unit 109, a power source operation unit 112, an operation unit 113, a memory 114, an HDR assist mode detection unit 115, and an enlargement display mode detection unit 116. The control unit 101 includes a data processing unit 110 and a display processing unit 111. The liquid crystal display unit 105 includes a touch panel 106, a liquid crystal panel 107, and a back light unit 108.

An image and sound input unit 102 acquire an image signal as an analog signal representing an image and a sound signal as an analog signal representing sound, and outputs the image and sound signals to the signal processing unit 103. According to the present exemplary embodiment, the image and sound input unit 102 includes an imaging unit (imaging sensor, i.e., image sensor) and a sound input unit (microphone). Light from a subject enters the imaging unit through a lens. Thus, an optical image representing the subject is formed on the imaging unit (image forming). The imaging unit converts the formed optical image into an image signal having a predetermined signal format, and outputs the image signal. The sound input unit converts the input sound into a sound signal and outputs the sound signal.

The signal processing unit 103 performs predetermined image processing on the analog signal output from the image and sound input unit 102. The predetermined image processing includes processing on the image signal, processing on the sound signal, or both of the two pieces of processing. The predetermined signal processing includes noise reduction processing for reducing noise components and Automatic Gain Control (AGC) processing for maintaining a constant signal level. The signal processing unit 103 includes an analog-to-digital (A/D) conversion unit for converting an analog signal having undergone predetermined signal processing into a digital signal (digital data). The signal processing unit 103 outputs to the control unit 101 digital data (image data as digital data representing an image and sound data as digital data representing sound) obtained by the A/D conversion unit.

The recording and reproduction unit 104 performs, for example, recording processing and reproduction processing. The recording processing refers to processing for recording in a storage unit the digital data (image data and sound data) output from the control unit 101 to the recording and reproduction unit 104. The reproduction processing refers to processing for reading the digital data (image data and sound data) from the storage unit and outputting the read digital data to the control unit 101. According to the present exemplary embodiment, the recording processing and the reproduction processing are switched in response to an instruction from the control unit 101.

The touch panel 106 is an operation unit capable of receiving various operations performed on the imaging apparatus. For example, the touch panel 106 can receive a mode setting operation for instruction to set the display mode, a mode cancel operation for instruction to cancel the setting of the display mode, a recording operation for instruction to perform the recording processing, and a reproduction operation for instruction to perform the reproduction processing. More specifically, the touch panel 106 detects a contact of a user onto the touch panel 106 and outputs the result of detecting a contact (contact position, contact time, and contact position change) to the control unit 101. The control unit 101 determines the performed operation based on the result of detecting a contact. According to the present exemplary embodiment, the touch panel 106 is provided on the display surface (screen) of the liquid crystal panel 107. The touch panel 106 may be formed at other positions. When the user performs a mode setting operation on the imaging apparatus, the control unit 101 sets the display mode corresponding to the mode setting operation. The control unit 101 can set one or more display modes out of a plurality of display modes. When the user performs a mode cancel operation on the imaging apparatus, the control unit 101 cancels the setting of the display mode corresponding to the mode cancel operation.

An image based on image data (input image data) is displayed by the liquid crystal panel 107 and the back light unit 108. More specifically, when image data is output from the control unit 101 to the liquid crystal panel 107, the transmissivity of the liquid crystal panel 107 is controlled to the transmissivity according to the image data output to the liquid crystal panel 107. The back light unit 108 irradiates the rear face of the liquid crystal panel 107. When light from the back light unit 108 penetrates the liquid crystal panel 107, an image is displayed. The dynamic range of the non-HDR liquid crystal panel 107 is assumed to be narrower than the dynamic range of the input image data of the HDR. For example, the maximum display luminance is assumed to be 100 nits. However, the maximum display luminance of the non-HDR liquid crystal panel 107 may be larger than 100 nits and equal to or smaller than 500 nits.

The back light driving unit 109 supplies a drive signal to the back light unit 108. For example, the back light driving unit 109 is a power source circuit for supplying a current to the back light unit 108. The back light unit 108 emits light with the luminance (amount of luminescence) according to the supplied drive signal. The control unit 101 can control the luminance of the back light unit 108. More specifically, the control unit 101 can control the drive signal output from the back light driving unit 109. Controlling the drive signal enables controlling the luminance of the back light unit 108. The control unit 101 controls a drive signal (the luminance of the back light unit 108) based on, for example, the input image data and an operation on the imaging apparatus.

The data processing unit 110 acquires input image data and input sound data. For example, in a time period during which the reproduction processing is performed, the data processing unit 110 acquires image data output from the recording and reproduction unit 104 as input image data and acquires sound data output from the recording and reproduction unit 104 as input sound data. In a time period during which the reproduction processing is not performed, the data processing unit 110 acquires image data output from the signal processing unit 103 as input image data and acquires sound data output from the signal processing unit 103 as input sound data. According to the present exemplary embodiment, when the user performs a reproduction operation on the imaging apparatus, the control unit 101 instructs the recording and reproduction unit 104 to perform the reproduction processing. As a result, the recording and reproduction unit 104 performs the reproduction processing.

The data processing unit 110 performs predetermined data processing on the acquired digital data. The predetermined data processing is processing on the input image data, processing on the input sound data, or both of the two pieces of processing. The predetermined data processing includes format conversion processing for converting the data format of digital data, resizing processing for converting the image size of the input image data, combination processing for combining graphic image data with the input image data. The graphic image data is On Screen Display (OSD) image data representing, for example, a menu image. The data processing unit 110 outputs image data having undergone the predetermined data processing to the display processing unit 111 and outputs sound data having undergone the predetermined data processing to a speaker. The speaker generates sound according to the sound data output to the speaker.

The data processing unit 110 can output the digital data (image data and sound data) output from the signal processing unit 103 to the recording and reproduction unit 104. According to the present exemplary embodiment, when the user performs a recording operation on the imaging apparatus, the control unit 101 instructs the recording and reproduction unit 104 to perform the recording processing. Then, the data processing unit 110 outputs the digital data output from the signal processing unit 103 to the recording and reproduction unit 104. As a result, the recording and reproduction unit 104 performs the recording processing.

According to the present exemplary embodiment, captured image data (image data representing an image of a subject) is used as input image data. However, the input image data is not limited to captured image data. For example, the input image data may be computer graphic image data, illustration image data, etc. The input image data may be still image data and moving image data.

The display processing unit 111 performs processing based on the set display mode. Then, the display processing unit 111 outputs the image data having undergone the above-described processing (processing based on the display mode setting) to the liquid crystal panel 107. The image data output to the liquid crystal panel 107 is image data based on the input image data output from the data processing unit 110. The liquid crystal display unit 105 thus displays an image based on the input image data.

The power source operation unit 112 is an operation unit (such as a switch) capable of receiving a start operation for instruction to activate the imaging apparatus and a stop operation for instruction to deactivate the imaging apparatus. The start operation also refers to "an operation for instruction to turn the imaging apparatus ON from OFF (change the power source state of the imaging apparatus)". The stop operation also refers to "an operation for instruction to turn the imaging apparatus OFF from ON". When the user performs the start operation on the imaging apparatus, the control unit 101 performs start processing for activating the imaging apparatus. When the user performs the stop operation on the imaging apparatus, the control unit 101 performs stop processing for deactivating the imaging apparatus.

The operation unit 113 is an operation unit (such as a switch) capable of receiving various operations on the imaging apparatus. For example, the operation unit 113 can receive a mode setting operation, a mode cancel operation, a recording operation, and a reproduction operation. Operations which can be received by the operation unit 113 may be identical to or different from operations which can be received by the touch panel 106.

The memory 114 temporarily stores data to be used in processing of the control unit 101.

The HDR assist mode detection unit 115 detects the setting of the HDR assist mode. Then, the HDR assist mode detection unit 115 outputs the result of detecting the setting of the HDR assist mode to the display processing unit 111. In other words, the HDR assist mode detection unit 115 determines whether the HDR assist mode is set. Then, the HDR assist mode detection unit 115 outputs the result of determining whether the HDR assist mode is set to the display processing unit 111.

Figure 4A:
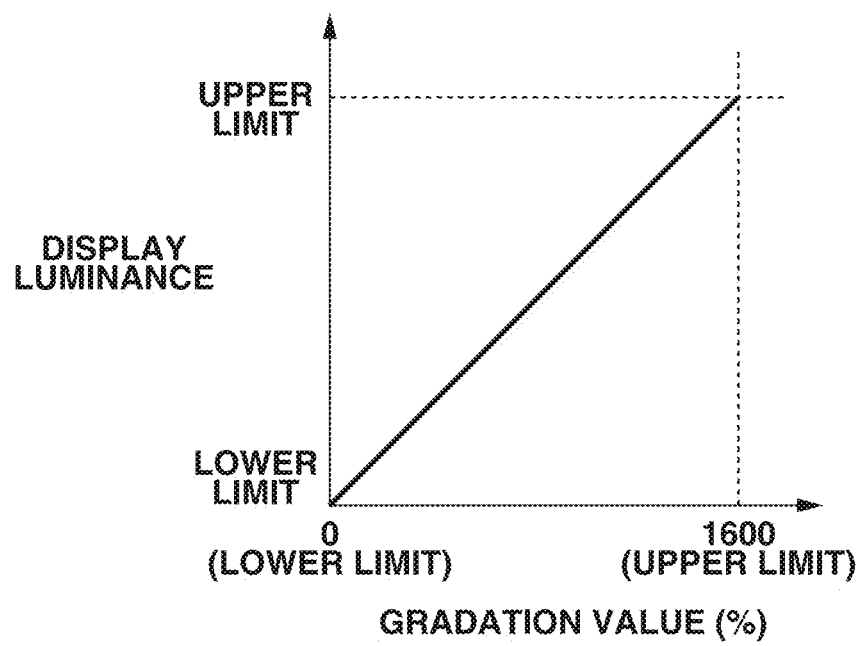
FIG. 4A illustrates an example of a correspondence relation between the gradation value of input image data and the display luminance of a liquid crystal panel according to the first exemplary embodiment.

The HDR assist mode refers to a display mode for reducing degradation in gradation of the input image data and displaying an image based on the input image data on the liquid crystal display unit 105. According to the present exemplary embodiment, the HDR assist mode refers to a display mode for display (HDR assist display) in the correspondence relation illustrated in FIG. 4A. FIG. 4A illustrates the correspondence relation between the gradation value of the input image data and the display luminance (luminance on the screen) of the liquid crystal display unit 105. In the correspondence relation illustrated in FIG. 4A, the display luminance of the liquid crystal display unit 105 linearly increases from the lower limit to the upper limit with increasing gradation value of the input image data (from the lower limit to the upper limit). The HDR assist mode is set, for example, when the user confirms the gradation of the entire gradation range of the input image data.

The correspondence relation in the HDR assist mode (the correspondence relation between the gradation value of the input image data and the display luminance of the liquid crystal display unit 105) is not limited to the correspondence relation illustrated in FIG. 4A. For example, in the correspondence relation in the HDR assist mode, the lower limit of the gradation value of the input image data may correspond to the display luminance different from the lower limit of the display luminance of the liquid crystal display unit 105. In the correspondence relation in the HDR assist mode, the upper limit of the gradation value of the input image data may correspond to the display luminance different from the upper limit of the display luminance of the liquid crystal display unit 105. In at least a part of the range of the gradation value of the input image data, the display luminance of the liquid crystal display unit 105 may nonlinearly change with a change of the gradation value of the input image data.

The enlargement display mode detection unit 116 detects the setting of the enlargement display mode. Then, the enlargement display mode detection unit 116 outputs the result of detecting the setting of the enlargement display mode to the display processing unit 111. In other words, the enlargement display mode detection unit 116 determines whether the enlargement display mode is set. Then, the enlargement display mode detection unit 116 outputs the result of determining whether the enlargement display mode has set to the display processing unit 111.

The enlargement display mode refers to a display mode for displaying an enlarged image of a part of the image region of the input image data on the liquid crystal display unit 105. The enlargement display mode also refers to "a display mode for displaying an enlarged image of a part of the image region of the input image data (enlargement display)". In other words, the enlargement display mode refers to a display mode for displaying an enlarged image in the standard mode. The enlargement display mode is set, for example, when the user performs focus confirmation (focus state confirmation, i.e., conforming which subject is in focus).

Figure 2:
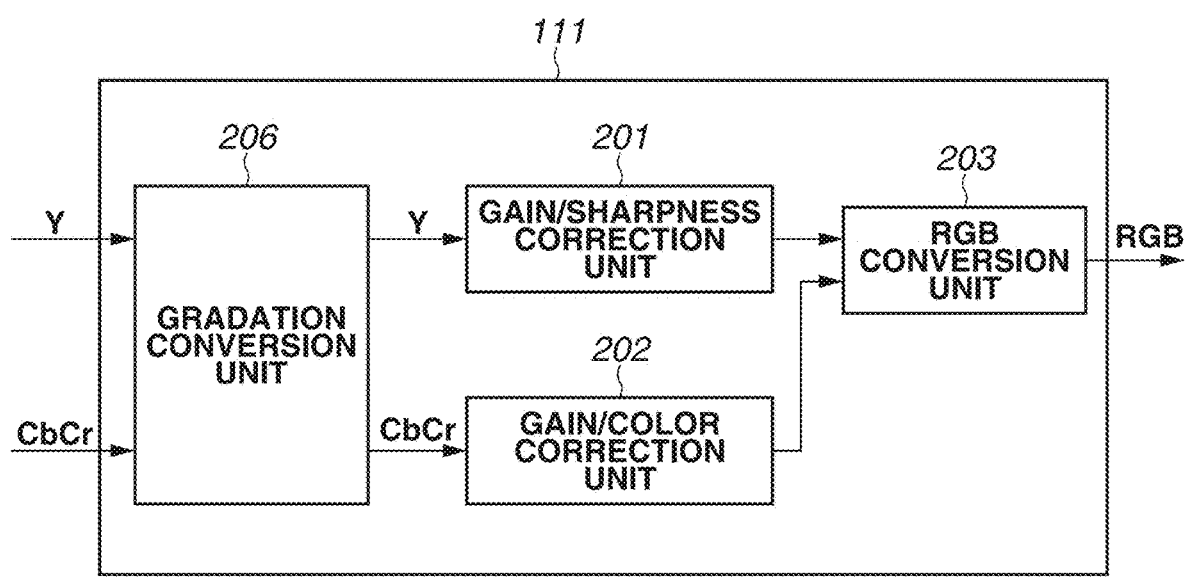
FIG. 2 illustrates an example of a configuration of a display processing unit according to the first exemplary embodiment.

The configuration of the display processing unit 111 will be described below with reference to FIG. 2. FIG. 2 illustrates an example of a configuration of the display processing unit 111. The data format of the input image data is not particularly limited. However, in the present exemplary embodiment, YCbCr data (YCbCr data before conversion) is output from the data processing unit 110 to the gradation conversion unit 206 as input image data (more specifically, image data having undergone the predetermined data processing). The YCbCr data refers to image data in which each pixel value includes YCbCr values (a combination of the Y, Cr, and Cb values).

The gradation conversion unit 206 generates YCbCr data after conversion by converting each gradation value of the YCbCr data before conversion. According to the present exemplary embodiment, the gradation conversion unit 206 converts the YCbCr values of the YCbCr data before conversion by using a three-dimensional look-up table (3DLUT) indicating the correspondence relation between the YCbCr values of the YCbCr data before conversion and the YCbCr values of the YCbCr data after conversion. Then, the gradation conversion unit 206 outputs the YCbCr data after conversion to a gain/sharpness correction unit 201 and a gain/color correction unit 202. More specifically, the gradation conversion unit 206 outputs luminance data (each Y value) included in the YCbCr data after conversion to the gain/sharpness correction unit 201 and outputs color difference data (each Cb value and each Cr value) included in the YCbCr data after conversion to the gain/color correction unit 202.

The gain/sharpness correction unit 201 performs predetermined processing on the luminance data included in the YCbCr data after conversion to generate processed luminance data. The predetermined processing includes gain adjustment processing for adjusting the gradation value and sharpness correction processing for emphasizing edges. Then, the gain/sharpness correction unit 201 outputs the processed luminance data to the RGB conversion unit 203.

The gain/color correction unit 202 performs predetermined processing on the color difference data included in the YCbCr data after conversion to generate processed color difference data. The predetermined processing includes gain adjustment processing and color correction processing for adjusting colors (color saturation, hue, etc.). Then, the gain/color correction unit 202 outputs the processed color difference data to the RGB conversion unit 203.

The RGB conversion unit 203 converts the combination of the processed luminance data and the processed color difference data (YCbCr data in which each pixel value includes a combination of the Y value of the processed image data, the Cb value of the processed color difference data, and the Cr value of the processed color difference data) into RGB data. The RGB data refers to image data in which each pixel value includes RGB values (a combination of the R, G, and B values). For example, the RGB conversion unit 203 converts the YCbCr data into the RGB data through one-dimensional matrix calculation processing. Then, the RGB conversion unit 203 outputs the RGB data to the liquid crystal panel 107.

According to the present exemplary embodiment, the gradation conversion processing for converting the gradation characteristics (correspondence relation between the gradation value and the display luminance) of the input image data is implemented by the processing of the gradation conversion unit 206. The conversion method of the gradation characteristics is not particularly limited. For example, instead of a look-up table, a function indicating the correspondence relation between the value before conversion (gradation value, pixel value, etc.) and the gradation value after conversion may be used.

Figure 3:
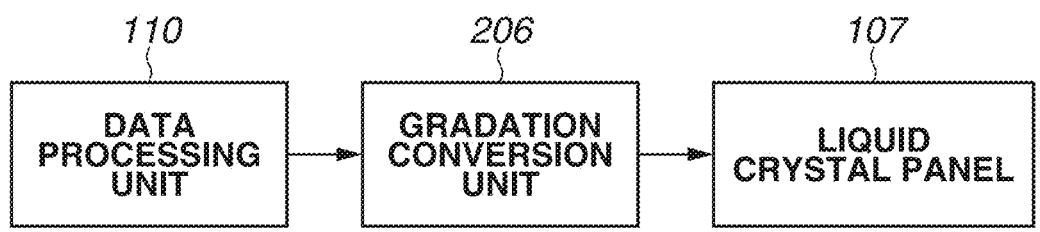
FIG. 3 illustrates some function units according to the first exemplary embodiment.

An example of the gradation conversion processing (the gradation conversion processing when the HDR assist mode is set and the gradation conversion processing when the HDR assist mode is not set) according to the present exemplary embodiment will be described below. FIG. 3 illustrates examples of function units related to the gradation conversion processing. As illustrated in FIG. 3, according to the present exemplary embodiment, the input image data (more specifically, the image data having undergone the predetermined data processing) is output from the data processing unit 110 to the gradation conversion unit 206. Then, the input image data undergoes the gradation conversion processing by the gradation conversion unit 206. Then, the image data having undergone the gradation conversion processing is output and displayed on the liquid crystal panel 107.

Figure 4B:
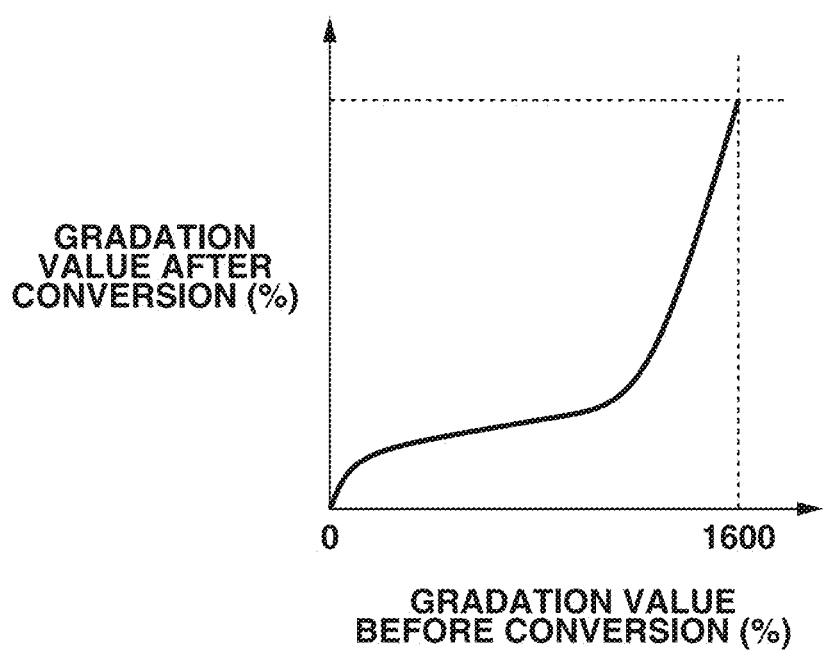
FIG. 4B illustrates an example of gradation conversion characteristics of first gradation conversion processing according to the first exemplary embodiment.

When the HDR assist mode is set, the gradation conversion processing (first gradation conversion processing) is performed to reduce degradation in gradation of the input image data and display an image based on the input image data on the liquid crystal display unit 105. According to the present exemplary embodiment, the gradation conversion processing for display based on the correspondence relation illustrated in FIG. 4A is performed as the first gradation conversion processing. More specifically, a LUT (3DLUT)1 is used by the gradation conversion unit 206. Thus, the above-described first gradation conversion processing is implemented. More specifically, the first gradation conversion processing in the conversion characteristics illustrated in FIG. 4B is performed as the gradation conversion processing using the LUT1. When image data having undergone the conversion by the conversion characteristics illustrated in FIG. 4B is input to the liquid crystal panel 107, the correspondence relation between the gradation value of the input image data and the display luminance of the liquid crystal panel 107 becomes the correspondence relation illustrated in FIG. 4A. The liquid crystal panel 107 has gradation characteristics resulting from the gamma characteristics, such as gamma 2.2, and individual variations at the time of manufacture. The conversion characteristics illustrated in FIG. 4B are used in consideration of the above-described gradation characteristics of the liquid crystal panel 107. The conversion characteristics illustrated in FIG. 4B also refer to the conversion characteristics corresponding to the inverse characteristics of the gradation characteristics (characteristics similar to the inverse gamma characteristics) of the liquid crystal panel 107. In the conversion characteristics illustrated in FIG. 4B, the range on the high gradation side of the input gradation value (gradation value before conversion) provides the gradation conversion characteristics for improving the gradation compared to the range of the intermediate gradation or the range on the low gradation side of the input gradation value. More specifically, the range on the high gradation side of the input gradation value (gradation value before conversion) provides the gradation conversion characteristics for improving the gradation, and the range of the intermediate gradation of the input gradation value (gradation value before conversion) provides the gradation conversion characteristics for degrading the gradation. Further, the range on the low gradation side of the input gradation value (gradation value before conversion) provides the gradation conversion characteristics for improving the gradation in a narrow range of the input gradation value in the vicinity of 0 and degrading the gradation in almost all other ranges.

Figure 5:
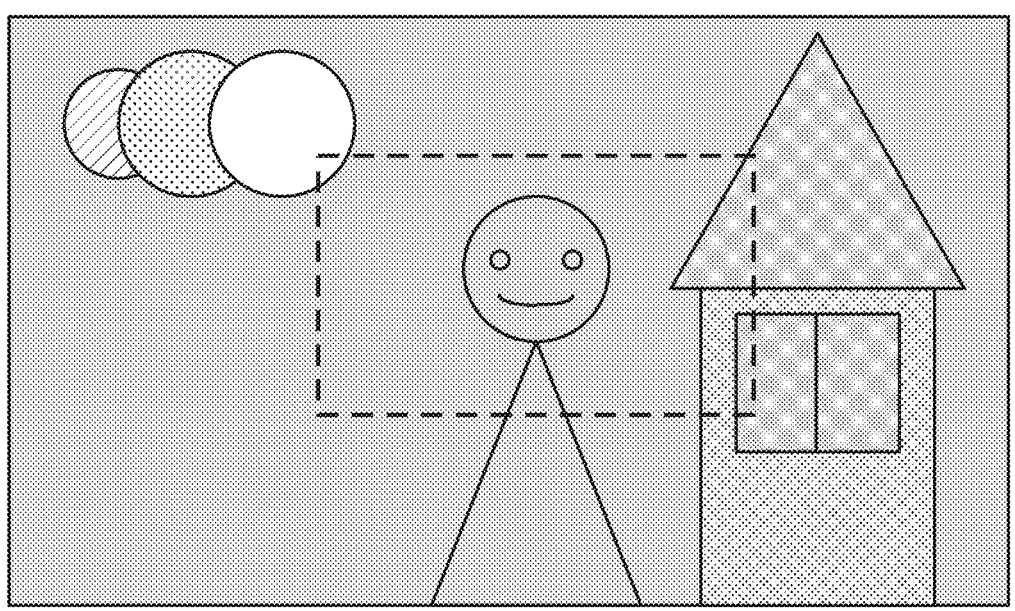
FIG. 5 illustrates an example of a display image according to the first exemplary embodiment.

FIG. 5 illustrates an example of a display image (image displayed on the screen) when the first gradation conversion processing is performed. When the first gradation conversion processing is performed, an image with the reduced gradation loss is displayed as illustrated in FIG. 5. This allows the user to highly accurately (easily) confirm the gradation from the low to the high luminances. Therefore, the first gradation conversion processing is gradation conversion processing which is desirable when the user confirms the gradation of the entire gradation range of the input image data. Most of the gradation values included in the input image data are 0 to 100%. Therefore, when the first gradation conversion processing is performed, an entirely dark image is displayed as illustrated in FIG. 5. However, the influence of the degradation in display luminance on the ease of gradation confirmation is small.

Figure 7A:
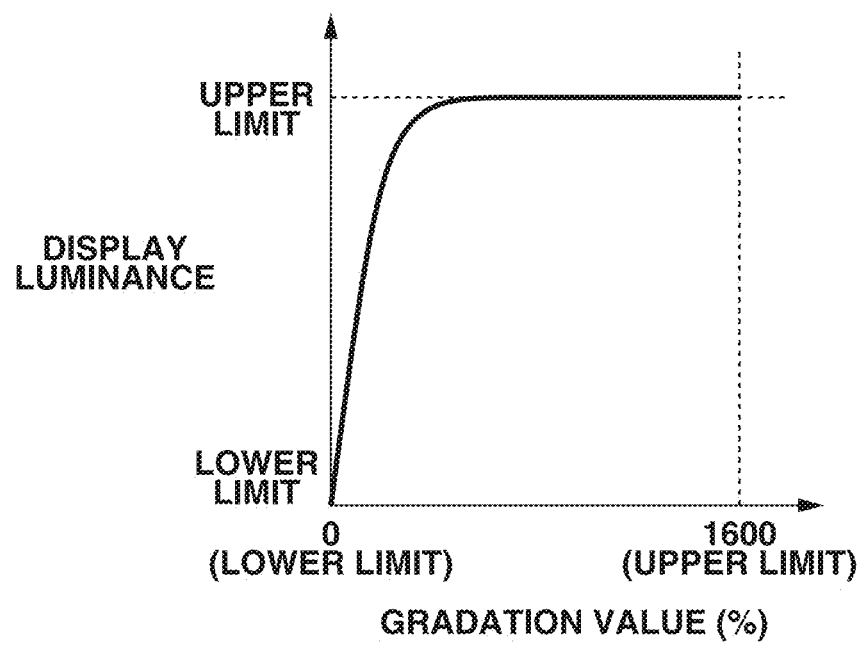
FIG. 7A illustrates an example of a correspondence relation between the gradation value of input image data and the display luminance of a liquid crystal panel according to the first exemplary embodiment.
Figure 7B:
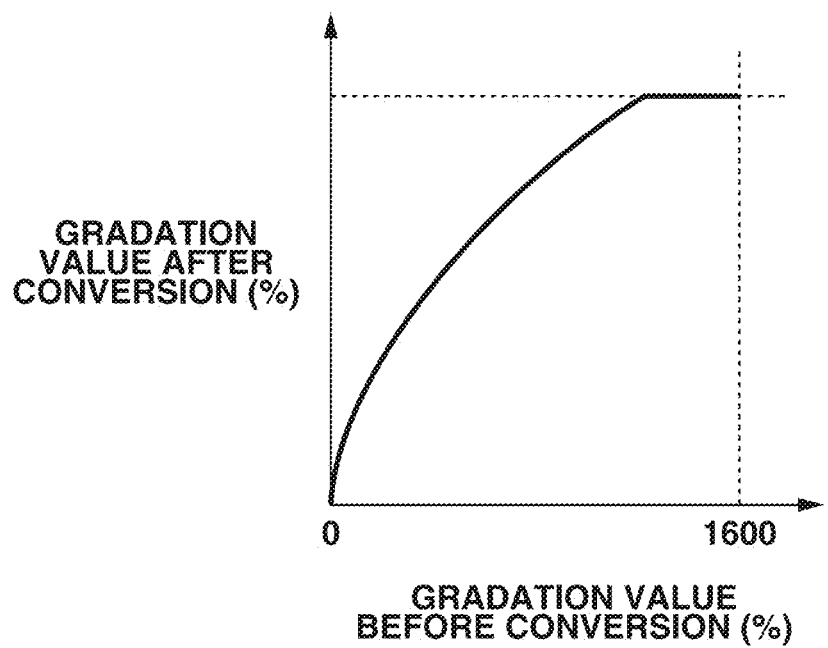
FIG. 7B illustrates an example of gradation conversion characteristics of second gradation conversion processing according to the first exemplary embodiment.

When the HDR assist mode is not set, i.e., when the standard mode is set, the gradation conversion processing (second gradation conversion processing) for displaying an image based on the input image data on the liquid crystal display unit 105 with more desirable luminance is performed. The standard mode is a mode, in particular, desirable for confirming the SDR image quality with the non-HDR (SDR) liquid crystal panel 107. According to the present exemplary embodiment, the gradation conversion processing for display based on the correspondence relation illustrated in FIG. 7A is performed as the second gradation conversion processing. FIG. 7A illustrates the correspondence relation between the gradation value of the input image data and the display luminance of the liquid crystal display unit 105. More specifically, a LUT2 (for example, a 3DLUT conforming to the BT.709 standard) different from the LUT1 is used by the gradation conversion unit 206. Thus, the above-described second gradation conversion processing is implemented. More specifically, the second gradation conversion processing based on the conversion characteristics illustrated in FIG. 7B is performed as the gradation conversion processing using the LUT2. When image data having undergone the conversion based on the conversion characteristics illustrated in FIG. 7B is input to the liquid crystal panel 107, the correspondence relation between the gradation value of the input image data and the display luminance of the liquid crystal panel 107 becomes the correspondence relation illustrated in FIG. 7A. The liquid crystal panel 107 has gradation characteristics resulting from the gamma characteristics, such as gamma 2.2, and individual variations at the time of manufacture. The conversion characteristics illustrated in FIG. 7B are used in consideration of the above-described gradation characteristics of the liquid crystal panel 107. In the conversion characteristics illustrated in FIG. 7B, the range on the low gradation side of the input gradation value (gradation value before conversion) provides the gradation conversion characteristics for improving the gradation compared to the range of the intermediate gradation or the range on the high gradation side of the input gradation value. More specifically, the range on the low gradation side of the input gradation value (gradation value before conversion) provides the gradation conversion characteristics for improving the gradation, and the range of the intermediate gradation or the range on the high gradation side of the input gradation value (gradation value before conversion) provides the gradation conversion characteristics for degrading the gradation. At least a part of the range on the high gradation side of the input gradation values (gradation value before conversion) provides the gradation conversion characteristics for converting the input gradation values so that the output gradation value (gradation value after conversion) becomes the upper limit. In the second gradation conversion processing, the gradation conversion characteristics for improving the gradation on the low gradation side and degrading the gradation on the high gradation side to a further extent than the first gradation conversion processing are applied.

Figure 6:
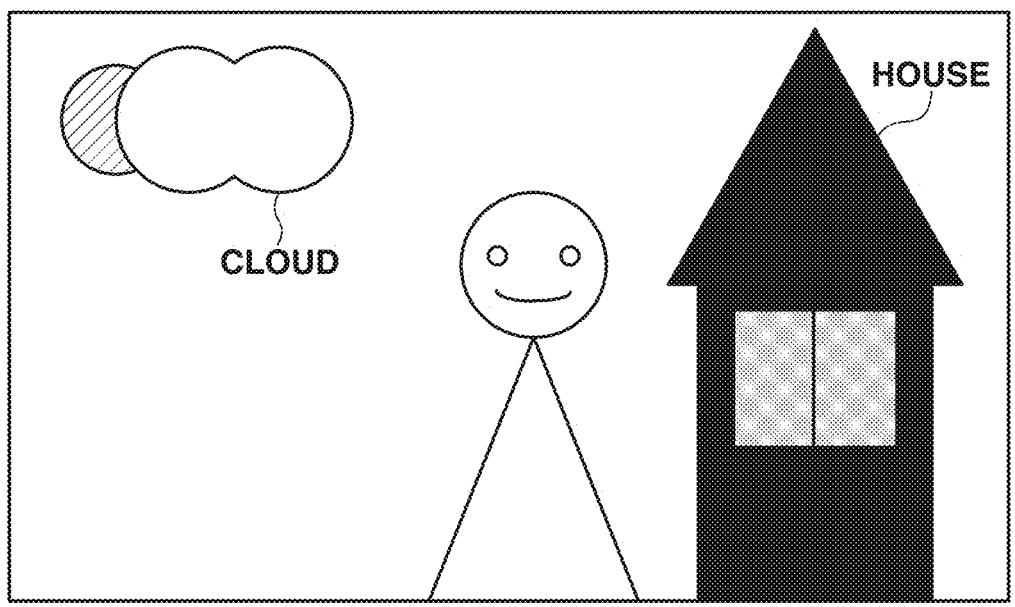
FIG. 6 illustrates an example of a display image according to the first exemplary embodiment.

FIG. 6 illustrates an example of an image displayed when the second gradation conversion processing is performed. When the second gradation conversion processing is performed, an image is displayed with a display luminance higher than that in a case where the first gradation conversion processing is performed in the HDR assist mode, as illustrated in FIG. 6. With high display luminance, it is easier for the user to confirm edges (contours) and perform focus confirmation than in a case of the low display luminance. Thus, the second gradation conversion processing refers to gradation conversion processing which is desirable when the user performs focus confirmation. When the second gradation conversion processing is performed, gradation loss occurs in the gradation range where the gradation value of the input image data is small and the gradation range where the gradation value of the input image data is large. In the example illustrated in FIG. 6, gradation loss has occurred in the image region of the cloud and the image region of the house. However, there is a small influence of gradation loss on the ease of performing focus confirmation.

In the correspondence relation illustrated FIG. 7A, a larger number of display luminances is associated with the low gradation side than with the high gradation side. However, the correspondence relation for the second gradation conversion processing is not limited to the correspondence relation illustrated in FIG. 7A. For example, a larger number of display luminances may be associated with the range of the intermediate gradation (neither high nor low gradation value) than with the range of other gradation values. Any correspondence relation may be used as long as an image based on the input image data can be displayed on the liquid crystal display unit 105 with a luminance higher than the luminance after the first gradation conversion processing is performed. When the HDR assist mode is not set, the gradation conversion processing may be omitted.

It is easier for the user to perform focus confirmation in a case where enlargement display is performed than in a case where enlargement display is not performed. Therefore, when the enlargement display mode is set, the possibility that focus confirmation is performed is higher than the possibility that the gradation of the input image data is confirmed regardless of whether the HDR assist mode is set. On the other hand, when the HDR assist mode is set and the enlargement display mode is not set, the possibility that the gradation of the input image data is confirmed is higher than the possibility that focus confirmation is performed. As described above, the first gradation conversion processing is desirable when the user confirms the gradation of the input image data, and the second gradation conversion processing is desirable when the user performs focus confirmation.

According to the present exemplary embodiment, thus, when the HDR assist mode is set and the enlargement display mode is not set, the display processing unit 111 performs the first gradation conversion processing on the input image data. More specifically, the gradation conversion unit 206 uses the LUT1. Thus, display desirable for the confirmation of the gradation of the input image data can be obtained when the possibility that the gradation of the input image data is confirmed is high. On the other hand, when the enlargement display mode is set in a state where the HDR assist mode is set, the control unit 101 temporarily or non-temporarily cancels the setting of the HDR assist mode. Thus, the display processing unit 111 performs the second gradation conversion processing on the input image data. More specifically, the gradation conversion unit 206 uses the LUT2. As a result, display desirable for focus confirmation can be obtained when the possibility that focus confirmation is performed is high. Thus, in the enlargement display mode, enlargement display is performed in the standard mode. When an enlargement display instruction is received in a state where the standard mode is set and when an enlargement display instruction is received in a state where the HDR assist mode is set, the second gradation conversion processing will be performed on the input image data.

An example of a processing flow of the imaging apparatus according to the present exemplary embodiment will be described below with reference to FIG. 8. FIG. 8 is an example of a flowchart illustrating processing of the imaging apparatus according to the present exemplary embodiment.

The processing flow illustrated in FIG. 8 is performed, for example, in response to a start operation using the power source operation unit 112 and a recording operation using the operation unit 113.

In step S801, the HDR assist mode detection unit 115 determines whether the HDR assist mode is set. When the HDR assist mode is set (YES in step S801), the processing proceeds to step S802. On the other hand, when the HDR assist mode is not set (NO in step S801), the processing proceeds to step S805.

In step S802, the display processing unit 111 performs the first gradation conversion processing on the input image data. More specifically, the gradation conversion unit 206 uses the LUT1. Thus, an image as illustrated in FIG. 5 is displayed on the liquid crystal display unit 105. Then, the processing proceeds to step S803. The processing in step S802 may be performed at the timing when the processing proceeds to step S804 from step S803.

In step S803, the enlargement display mode detection unit 116 determines whether the enlargement display mode is set. When the enlargement display mode is set (YES in step S803), the processing proceeds to step S804. On the other hand, when the enlargement display mode is not set (NO in step S803), the processing proceeds to step S805.

Figure 9:
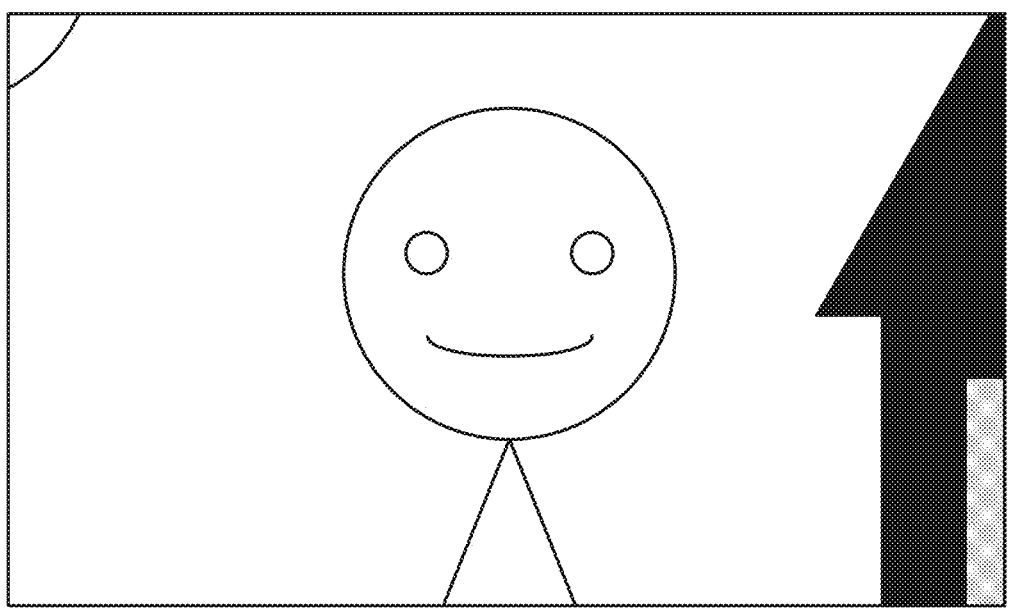
FIG. 9 illustrates an example of a display image according to the first exemplary embodiment.

In step S804, the control unit 101 cancels the setting of the HDR assist mode. Thus, the display processing unit 111 performs the second gradation conversion processing on the input image data. More specifically, the gradation conversion unit 206 uses the LUT2. As a result, an image as illustrated in FIG. 9 is displayed. The image illustrated in FIG. 9 is an enlarged image of the image region (image region subjected to enlargement display, i.e., enlargement region) enclosed in dashed lines illustrated in FIG. 5. The image illustrated in FIG. 9 is brighter than the image illustrated in FIG. 5. Then, the processing returns to step S803.

The control unit 101 repeats the processing in step S804 in the time period during which the enlargement display mode is set. More specifically, the cancellation of the setting of the HDR assist mode is maintained in the time period during which the enlargement display mode is set. When the setting of the enlargement display mode is cancelled (NO in step S803), the processing proceeds to step S805 from step S803. The HDR assist mode may or may not be set according to the cancellation of the setting of the enlargement display mode. For example, when the setting of the enlargement display mode is canceled, the cancellation of the setting of the HDR assist mode may be maintained.

In step S805, the control unit 101 determines whether a stop operation using the power source operation unit 112 has been performed. When the stop operation has not been performed (NO in step S805), the processing returns to step S801. Then, the control unit 101 repeats the processing in steps S801 to S805 until the stop operation is performed. When the stop operation is performed (YES in step S805), the processing exits the processing of this flowchart. The method for determining whether to exit the processing of the flowchart illustrated in FIG. 8 is not limited thereto. For example, the control unit 101 may repeat the processing in steps S801 to S805 until the reproduction end operation (an operation for instructing to end the reproduction processing) is performed, and end the processing flow illustrated in FIG. 8 in response to the reproduction end operation. The control unit 101 may repeat the processing in steps S801 to S805 until the recording end operation (an operation for instructing to end the recording processing) is performed, and end the processing of the flowchart illustrated in FIG. 8 in response to the recording end operation.

As described above, according to the present exemplary embodiment, the first gradation conversion processing is performed when the HDR assist mode is set and the enlargement display mode is not set. Then, when the enlargement display mode is set in a state where the HDR assist mode is set, the setting of the HDR assist mode is canceled. Thus, desirable display, for example, display desirable for the use of an image, can be more reliably obtained.

According to the present exemplary embodiment, when the enlargement display mode is set in a state where the HDR assist mode is set, the setting of the HDR assist mode is automatically canceled. However, the setting of the HDR assist mode does not need to be automatically canceled. For example, when the enlargement display mode is set in a state where the HDR assist mode is set, the user may be inquired about whether to cancel the setting of the HDR assist mode through a sound output, image display, etc. The setting of the HDR assist mode may be canceled when an operation for permitting cancellation is performed, and maintained when an operation for not permitting cancellation is performed. Whether to automatically cancel the setting of the HDR assist mode may be changed. For example, whether the setting of the HDR assist mode is automatically canceled may be changed based on an operation performed on the displayed menu image by the user.

Instead of the enlargement display mode, other display modes highly likely to be set when the user performs focus confirmation may be used. More specifically, the peaking mode as a display mode for emphasizing high frequency components (contour components) and displaying an image on the liquid crystal display unit 105 may be used.

A second exemplary embodiment of the present invention will be described below. Points (configuration and processing) different from the first exemplary embodiment will be described in detail below, and descriptions of the same points as the first exemplary embodiment will be omitted. According to the present exemplary embodiment, the processing when the setting of the enlargement display mode is performed in a state where the HDR assist mode is set differs from the first exemplary embodiment. The present exemplary embodiment will be described below based on an example for reducing degradation in gradation of a desired gradation range even when the enlargement display mode is set.

Figure 10:
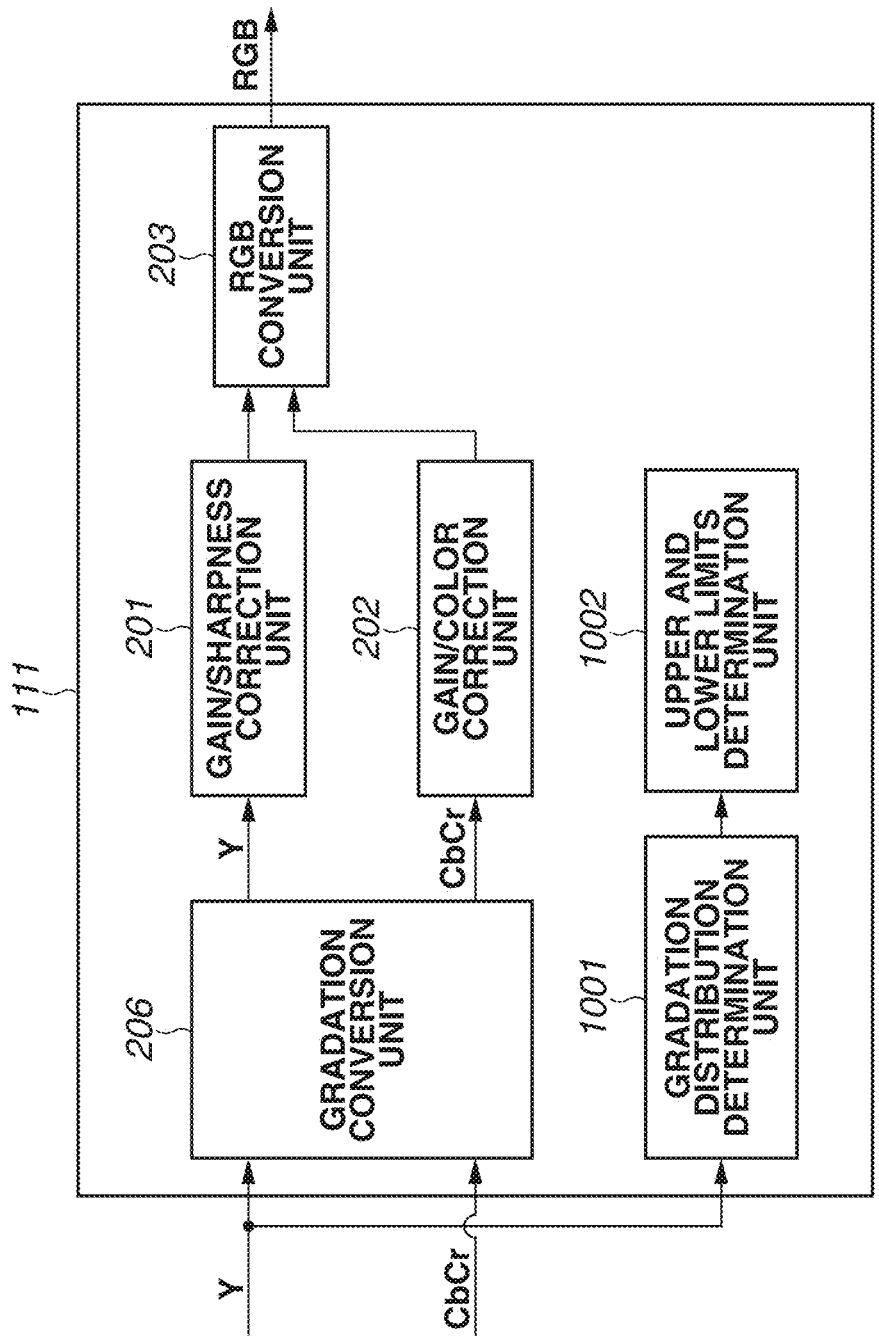
FIG. 10 illustrates an example of a configuration of a display processing unit according to a second exemplary embodiment.

The configuration of the imaging apparatus according to the present exemplary embodiment is similar to the configuration according to the first exemplary embodiment (FIG. 1). The configuration of the display processing unit 111 according to the present exemplary embodiment will be described below with reference to FIG. 10. FIG. 10 illustrates an example of a configuration of the display processing unit 111 according to the present exemplary embodiment. Referring to FIG. 10, function units identical to those in the first exemplary embodiment (FIG. 2) are assigned the same reference numerals as those in the first exemplary embodiment. As illustrated in FIG. 10, the display processing unit 111 according to the present exemplary embodiment further includes a gradation distribution determination unit 1001 and an upper and lower limits determination unit 1002.

When the HDR assist mode is set and the enlargement display mode is not set, the first gradation conversion processing is performed similar to the first exemplary embodiment. The gradation distribution determination unit 1001 and the upper and lower limits determination unit 1002 are used when the enlargement display mode is set.

When the enlargement display mode is set, the data processing unit 110 performs resizing processing for matching the resolution of the enlargement region of the input image data with the resolution of the liquid crystal display unit 105 (liquid crystal panel 107) and extraction processing for extracting the image data in the enlargement region. Then, the image data having undergone the resizing processing and the extraction processing is input to the display processing unit 111.

The gradation distribution determination unit 1001 determines the frequency distribution (histogram) of the gradation value of the input image data based on the input image data. The gradation distribution determination unit 1001 determines the frequency distribution of the gradation value by using the input image data of one or more frames. According to the present exemplary embodiment, the gradation distribution determination unit 1001 determines the luminance histogram as a frequency distribution of the Y value (luminance level) of the input image data.

The frequency distribution of the gradation value is not limited to the frequency distribution of the Y value. The frequency distribution of the R value, the frequency distribution of the G value, the frequency distribution of the B value, the frequency distribution of the RGB values, etc. may be determined. According to the present exemplary embodiment, the image data having undergone the extraction processing is supplied to the display processing unit 111, and therefore the frequency distribution in the enlargement region is determined. However, a frequency distribution different from the frequency distribution in the enlargement region may be determined. For example, the frequency distribution in the entire image region may be determined. However, using the frequency distribution in the enlargement region enables reducing degradation in gradation of a desired gradation range to a further extent than in a case where other frequency distributions are used.

The upper and lower limits determination unit 1002 detects a range of the gradation value in which the number of pixels existing in the input image data is a first threshold value or above, by using the frequency distribution determined by the gradation distribution determination unit 1001. As described above, according to the present exemplary embodiment, the frequency distribution determined by the gradation distribution determination unit 1001 is a frequency distribution in the enlargement region. Therefore, according to the present exemplary embodiment, it is possible to detect a range of the gradation value in which the number of pixels existing in the enlargement region is the first threshold value or above. According to the present exemplary embodiment, 1 is used as the first threshold value. Therefore, a range of the gradation value in which pixels exist in the enlargement region is detected. A value larger than 1 may be used as the first threshold value. The first threshold value may be a fixed value predetermined by a maker, and may be a value which can be changed by the user.

Then, based on the detected range (gradation value range, i.e., gradation range), the upper and lower limits determination unit 1002 changes the gradation conversion processing performed by the display processing unit 111 from the first gradation conversion processing to the third gradation conversion processing. The third gradation conversion processing refers to gradation conversion processing for reducing degradation in gradation of the input image data in the detected gradation range and displaying an image based on the input image data on the liquid crystal display unit 105.

The first gradation conversion processing according to the present exemplary embodiment refers to gradation conversion processing for converting each gradation value of the input image data so that the following conditions 1 and 2 are satisfied. More specifically, the first gradation conversion processing according to the present exemplary embodiment refers to gradation conversion processing for display in the correspondence relation illustrated in FIG. 4A.

Condition 1: The lower limit of the gradation value of the input image data corresponds to the lower limit of the display luminance of the liquid crystal display unit 105.

Condition 2: The upper limit of the gradation value of the input image data corresponds to the upper limit of the display luminance of the liquid crystal display unit 105.

On the other hand, the third gradation conversion processing according to the present exemplary embodiment refers to gradation conversion processing for converting each gradation value of the input image data so that the following conditions 3 and 4 are satisfied. When the conditions 3 and 4 are satisfied, a larger number of display luminances can be associated with the detected gradation range. It is therefore possible not only to obtain a desirable display luminance but also to obtain a display image with reduced degradation in gradation. As a result, focus confirmation can be made easier to perform.

Condition 3: The lower limit of the detected gradation range corresponds to the lower limit of the display luminance of the liquid crystal display unit 105.

Condition 4: The upper limit of the detected gradation range corresponds to the upper limit of the display luminance of the liquid crystal display unit 105.

The conditions 3 and 4 can be the following conditions 5 and 6. The liquid crystal input value refers to a gradation value of the image data input to the liquid crystal panel 107. When the liquid crystal input value is an 8-bit value (0 to 255), the lower limit 0 of the liquid crystal input value corresponds to the lower limit of the display luminance of the liquid crystal display unit 105, and the upper limit 255 of the liquid crystal input value corresponds to the upper limit of the display luminance of the liquid crystal display unit 105.

Condition 5: The lower limit of the detected gradation range corresponds to the lower limit of the liquid crystal input value.

Condition 6: The upper limit of the detected gradation range corresponds to the upper limit of the liquid crystal input value.

The upper and lower limits determination unit 1002 sets LUT(3DLUT)3 for implementing the third gradation conversion processing which satisfies the conditions 3 and 4 (conditions 5 and 6) to the gradation conversion unit 206. Thus, the 3DLUT used by the gradation conversion unit 206 is changed from the LUT1 to the LUT3. As a result, the gradation conversion processing performed by the display processing unit 111 is changed from the first gradation conversion processing to the third gradation conversion processing.

Figure 12A:
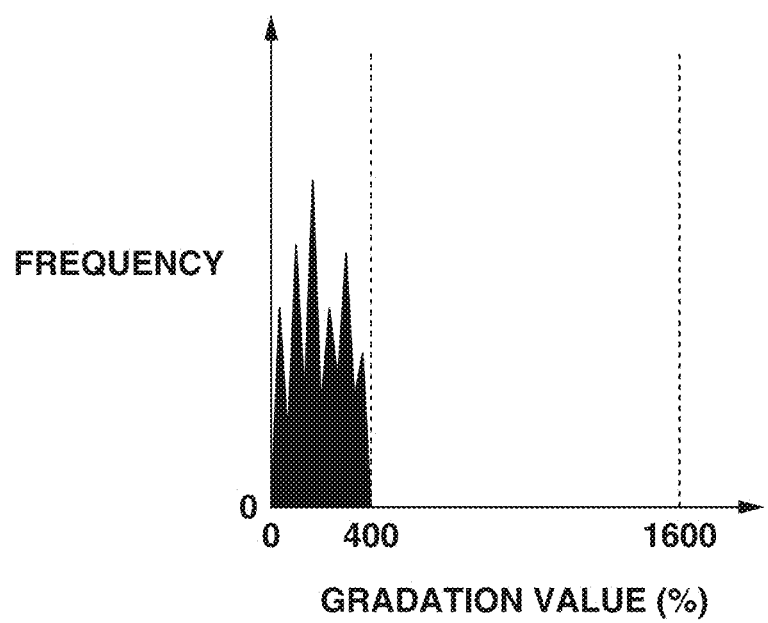
FIGS. 12A and 12B illustrate examples of frequency distributions according to the second exemplary embodiment.
Figure 12B:
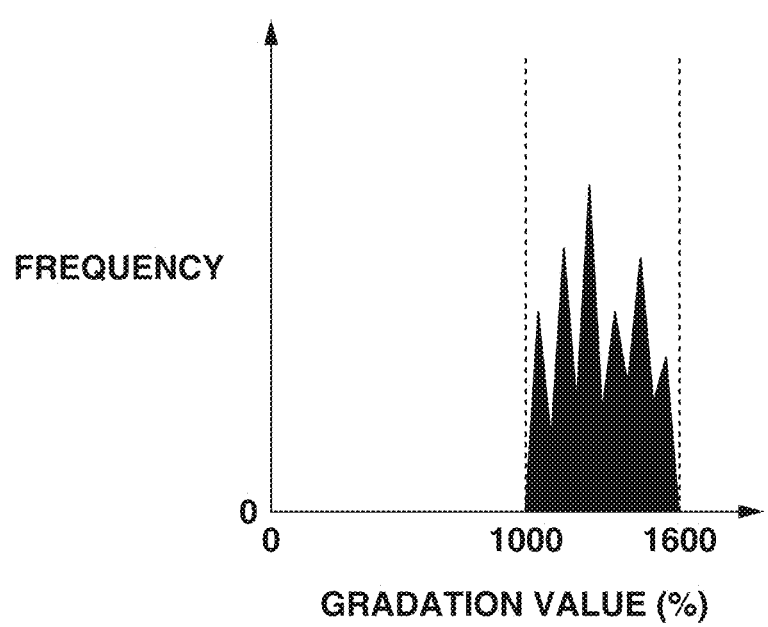
Figure 13A:
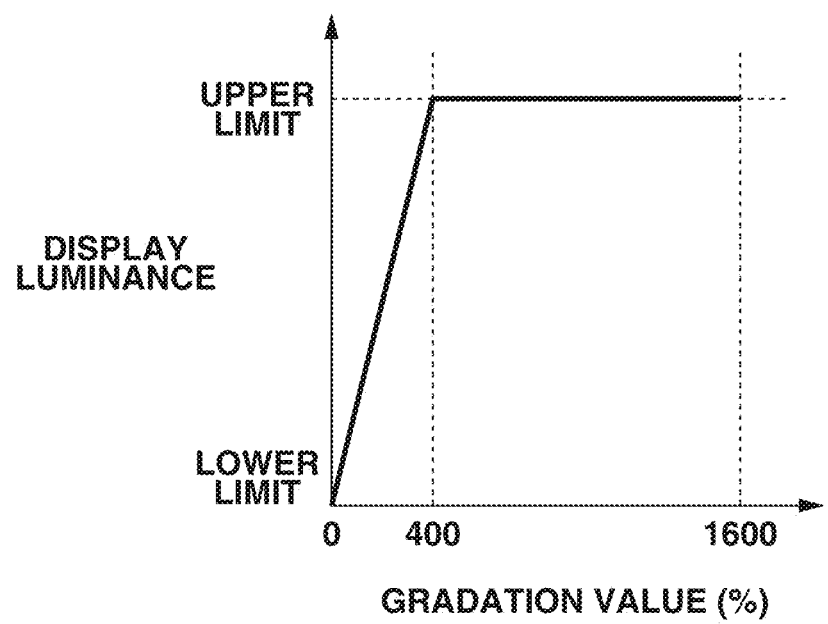
FIGS. 13A to 13B illustrate examples of correspondence relations between the gradation value of input image data and the display luminance of a liquid crystal panel according to the second exemplary embodiment.
Figure 13B:
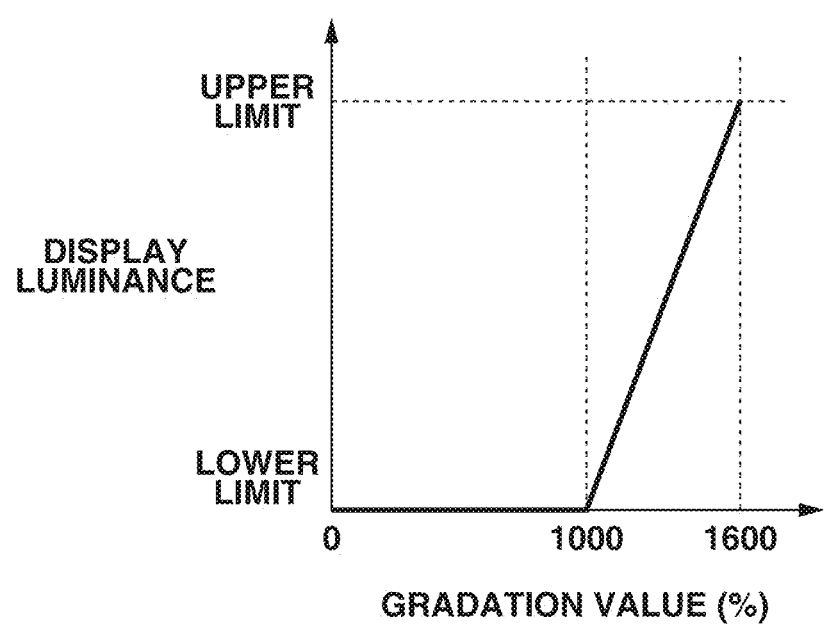

FIGS. 12A and 12B illustrate examples of frequency distributions (frequency distributions of the Y value) determined by the gradation distribution determination unit 1001. FIGS. 13A and 13B illustrate examples of correspondence relations for the third gradation conversion processing (correspondence relations between the gradation value of the input image data and the display luminance of the liquid crystal display unit 105).

The correspondence relation illustrated in FIG. 13A refers to the correspondence relation when the frequency distribution illustrated in FIG. 12A is obtained. In the frequency distribution illustrated in FIG. 12A, the minimum gradation value with a frequency of 1 or higher is 0% and the maximum gradation value with a frequency of 1 or higher is 400%. Therefore, the gradation range from 0% to 400% is detected by the upper and lower limits determination unit 1002. Then, as illustrated in FIG. 13A, the lower limit 0% of the detected gradation range is associated with the lower limit of the display luminance, and the upper limit 400% of the detected gradation range is associated with the upper limit of the display luminance. In the correspondence relation illustrated in FIG. 13A, the display luminance of the liquid crystal display unit 105 linearly increases from the lower limit to the upper limit with increasing gradation value of the input image data (from 0% to 400%).

The correspondence relation illustrated in FIG. 13B refers to the correspondence relation when the frequency distribution illustrated in FIG. 12B is obtained. In the frequency distribution illustrated in FIG. 12B, the minimum gradation value with a frequency of 1 or higher is 1,000% and the maximum gradation value with a frequency of 1 or higher is 1,600%. Therefore, the gradation range from 1,000% to 1,600% is detected by the upper and lower limits determination unit 1002. Then, as illustrated in FIG. 13B, the lower limit 1,000% of the detected gradation range is associated with the lower limit of the display luminance, and the upper limit 1,600% of the detected gradation range is associated with the upper limit of the display luminance. In the correspondence relation illustrated in FIG. 13B, the display luminance of the liquid crystal display unit 105 linearly increases from the lower limit to the upper limit with increasing gradation value of the input image data (from 1,000% to 1,600%).

The correspondence relation for the third gradation conversion processing is not limited to the correspondence relation illustrated in FIGS. 13A and 13B. For example, in the correspondence relation for the third gradation conversion processing, the lower limit of the detected gradation range may correspond to a display luminance different from the lower limit of the display luminance of the liquid crystal display unit 105. In the correspondence relation for the third gradation conversion processing, the upper limit of the detected gradation range may correspond to a display luminance different from the upper limit of the display luminance of the liquid crystal display unit 105. In at least a part of the gradation range corresponding to the range of the display luminance, the display luminance of the liquid crystal display unit 105 may nonlinearly change with a change of the gradation value of the input image data.

Figure 11:
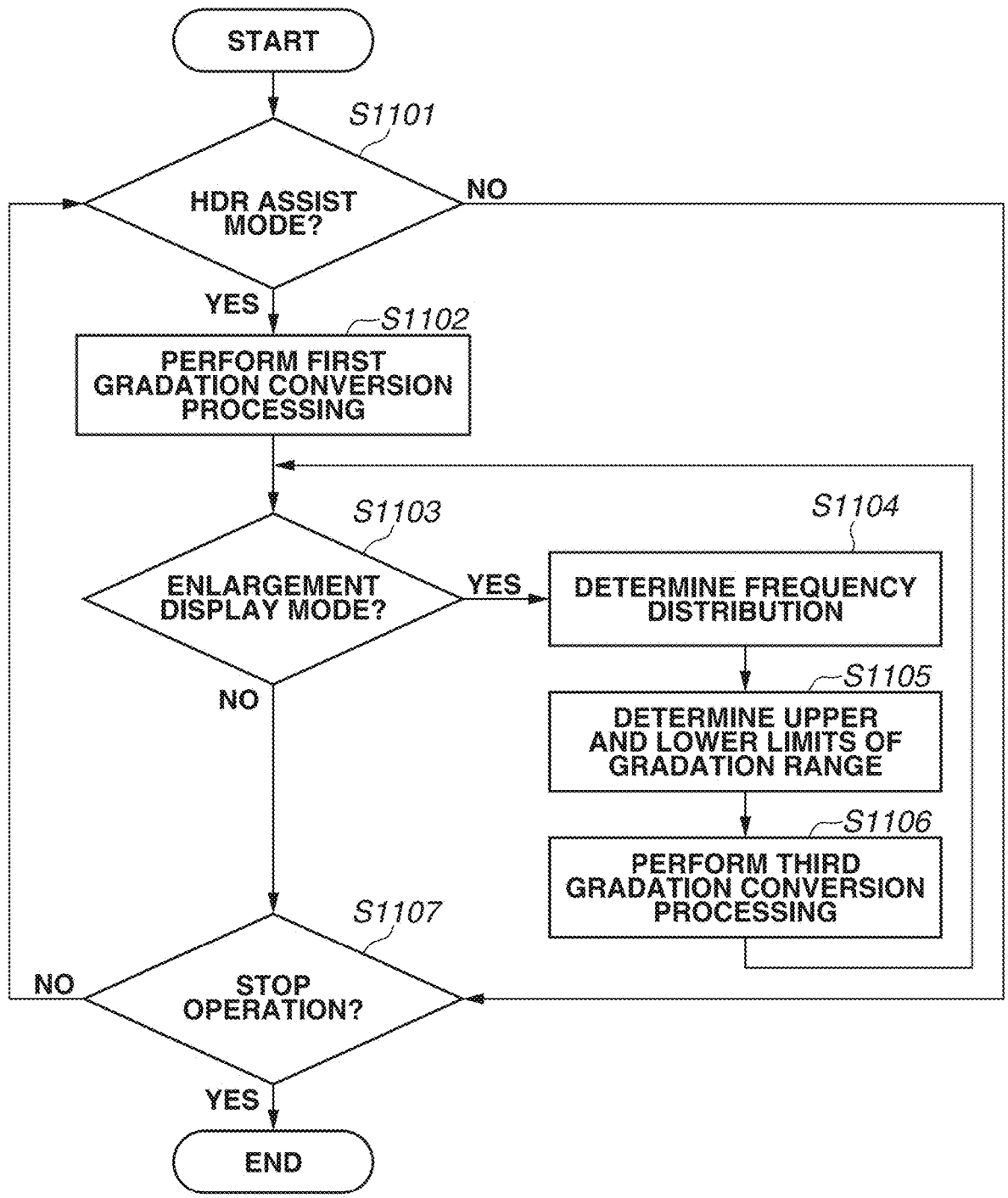
FIG. 11 is an example of a flowchart illustrating processing according to the second exemplary embodiment.

An example of a processing flow of the imaging apparatus according to the present exemplary embodiment will be described below with reference to FIG. 11. FIG. 11 is an example of a flowchart illustrating processing of the imaging apparatus according to the present exemplary embodiment. Processing in steps S1101 to S1103 is similar to the processing in steps S801 to S803 according to the first exemplary embodiment (FIG. 8). When the enlargement display mode is set (YES in step S1103), the processing proceeds to step S1104 from step S1103. Meanwhile, when the enlargement display mode is not set (NO in step S1103), the processing proceeds to step S1107 from step S1103. Processing in step S1107 is similar to the processing in step S805 according to the first exemplary embodiment.

In step S1104, the gradation distribution determination unit 1001 determines the frequency distribution of the Y value of the input image data based on the input image data. Then, the processing proceeds to step S1105.

In step S1105, the upper and lower limits determination unit 1002 detects the upper and lower limits of the range of the gradation value in which pixels exist in the enlargement region based on the result of the determination in step S1104. Then, the processing proceeds to step S1106.

In step S1106, the upper and lower limits determination unit 1002 sets to the gradation conversion unit 206 the LUT3 for implementing the third gradation conversion processing which satisfies the following conditions 7 and 8. Thus, the 3DLUT used by the gradation conversion unit 206 is changed from the LUT1 to the LUT3, and the gradation conversion processing performed by the display processing unit 111 is changed from the first gradation conversion processing to the third gradation conversion processing. As a result, enlargement display is performed while the third gradation conversion processing is being performed. Then, the processing returns to step S1103. The conditions 7 and 8 are similar to the conditions 3 and 4 (conditions 5 and 6). Condition 7: The lower limit (gradation value) detected in step S1105 corresponds to the lower limit of the liquid crystal input value.
Condition 8: The upper limit (gradation value) detected in step S1105 corresponds to the upper limit of the liquid crystal input value.

In the time period during which the enlargement display mode is set, the processing in steps S1104 to S1106 is repeated. More specifically, the execution of the third gradation conversion processing is maintained in the time period during which the enlargement display mode is set. When the setting of the enlargement display mode is canceled (NO in step S1103), the processing proceeds to step S1107 from step S1103. The gradation conversion processing may or may not be changed to the first gradation conversion processing in response to the cancellation of the setting of the enlargement display mode. For example, when the setting of the enlargement display mode is canceled, the third gradation conversion processing which is the latest setting may be maintained.

As described above, according to the present exemplary embodiment, the third gradation conversion processing is performed when the enlargement display mode is set. Thus, more desirable display can be obtained when the enlargement display mode is set in a state where the HDR assist mode is set.

Although, in the present exemplary embodiment, the upper and lower limits determination unit 1002 detects in step S1105 the upper and lower limits of the range of the gradation value in which pixels exist in the enlargement region, only the upper limit of the range of the gradation value in which pixels exist in the enlargement region may be detected. In this case, the third gradation conversion processing satisfying only the condition 4 out of the above-described conditions 3 and 4 is performed. As a result, the correspondence relation when the frequency distribution illustrated in FIG. 12A is obtained is as illustrated in FIG. 13A, and the correspondence relation when the frequency distribution illustrated in FIG. 12B is obtained is as illustrated in FIG. 4A.

A third exemplary embodiment of the present invention will be described below. In the following descriptions, points different from the first and the second exemplary embodiments are described in detail, and descriptions of points similar to the first and the second exemplary embodiments will be omitted. According to the present exemplary embodiment, processing when the enlargement display mode is set differs from the processing in the first and the second exemplary embodiments. The present exemplary embodiment will be described below based on an example for obtaining more desirable display than in the first and the second exemplary embodiments when the enlargement display mode is set in a state where the HDR assist mode is set.

Figure 14:
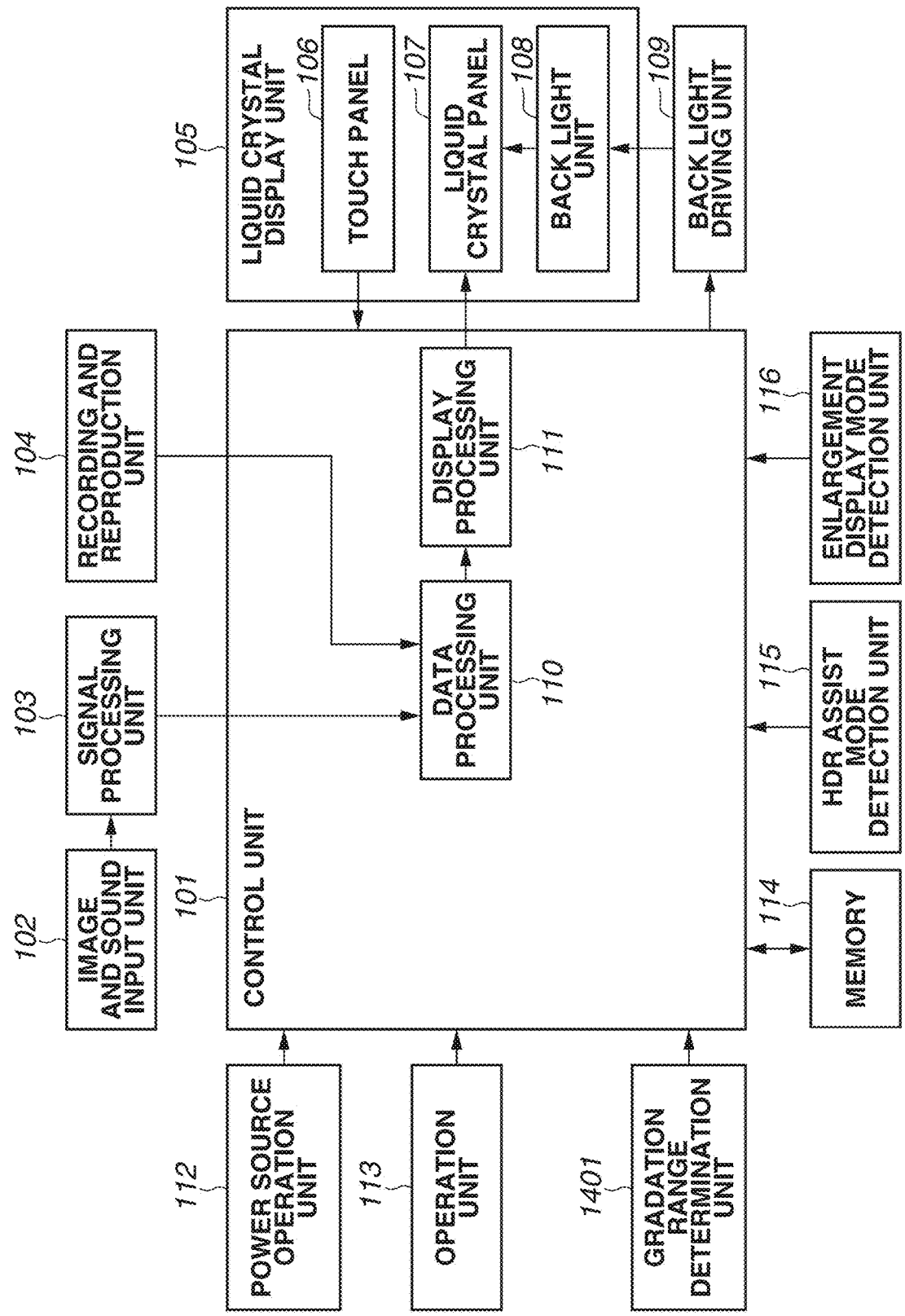
FIG. 14 illustrates an example of a configuration of an imaging apparatus according to a third exemplary embodiment.

The configuration of the imaging apparatus according to the present exemplary embodiment will be described below with reference to FIG. 14. FIG. 14 illustrates an example of a configuration of the imaging apparatus according to the present exemplary embodiment. Referring to FIG. 14, function units similar to those according to the first exemplary embodiment (FIG. 1) are assigned the same reference numerals as those according to the first exemplary embodiment. As illustrated in FIG. 14, the imaging apparatus according to the present exemplary embodiment further includes a gradation range determination unit 1401. The configuration of the display processing unit 111 according to the present exemplary embodiment is similar to the configuration of the display processing unit 111 according to the second exemplary embodiment.

The gradation range determination unit 1401 determines whether the width of the gradation range (a range of the gradation value in which the number of pixels existing in the input image data is the first threshold value or above) detected by the upper and lower limits determination unit 1002 is a second threshold value or below. Then, the gradation range determination unit 1401 outputs to the control unit 101 the result of determining the width of the gradation range (the result of determining whether the width of the gradation range is the second threshold value or below). According to the present exemplary embodiment, the second threshold value is 600%.

The second threshold value may be larger or smaller than 600%. For example, the second threshold value is determined based on the upper limit of the display luminance of the liquid crystal display unit 105, the lower limit of the display luminance of the liquid crystal display unit 105, or both of the two limits. Thus, a more desirable value can be acquired as the second threshold value. The second threshold value may be a fixed value predetermined by a maker or a value which can be changed by the user.

When the width of the gradation range detected by the upper and lower limits determination unit 1002 is small, enlargement display with the reduced degradation in gradation can be obtained with a desirable display luminance by performing the third gradation conversion processing. However, when the width of the gradation range detected by the upper and lower limits determination unit 1002 is large, performing the third gradation conversion processing may largely reduce the display luminance. This may lead to difficulty in focus confirmation. Meanwhile, even when the width of the gradation range detected by the upper and lower limits determination unit 1002 is large, cancelling the setting of the HDR assist mode enables obtaining enlargement display with a desirable display luminance. Focus confirmation can be thus easily performed. Accordingly, when the width of the gradation range detected by the upper and lower limits determination unit 1002 is large, it is more desirable to cancel the setting of the HDR assist mode than to perform the third gradation conversion processing.

According to the present exemplary embodiment, therefore, when the enlargement display mode is set and the width of the detected gradation range is the second threshold value or below, the display processing unit 111 performs the third gradation conversion processing on the input image data. Then, when the enlargement display mode is set and the detected the width of the detected gradation range is wider than the second threshold value, the display processing unit 111 cancels the setting of the HDR assist mode. More specifically, when the enlargement display mode is set in a state where the HDR assist mode is set and the width of the detected width of the gradation range is the second threshold value or below, the gradation conversion unit 206 uses the LUT3 corresponding to the third gradation conversion processing. Then, when the enlargement display mode is set in a state where the HDR assist mode is set and the width of the detected gradation range is wider than the second threshold value, the gradation conversion unit 206 uses the LUT2 corresponding to the second gradation conversion processing.

Figure 16A:
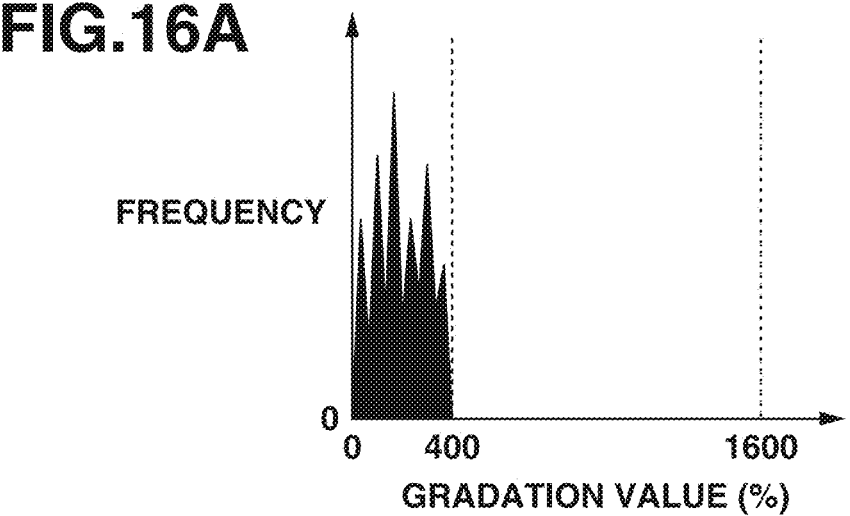
FIGS. 16A to 16C illustrate examples of frequency distributions according to the third exemplary embodiment.
Figure 16B:
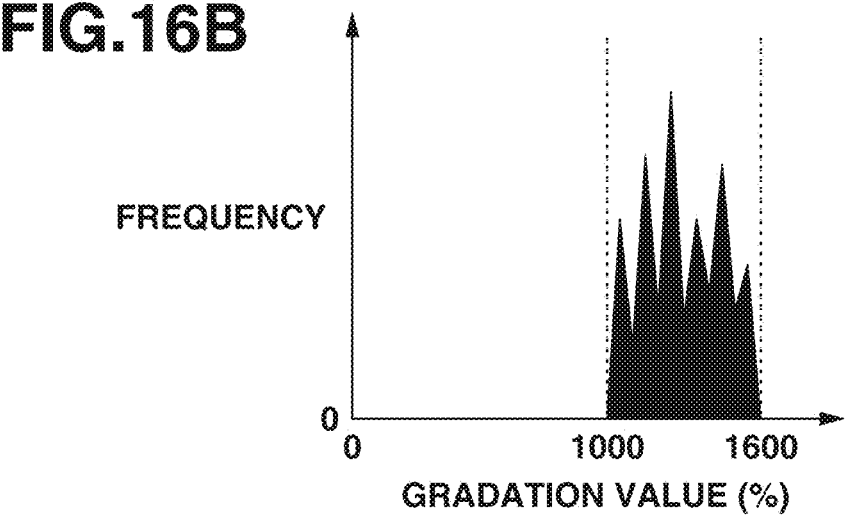
Figure 16C:
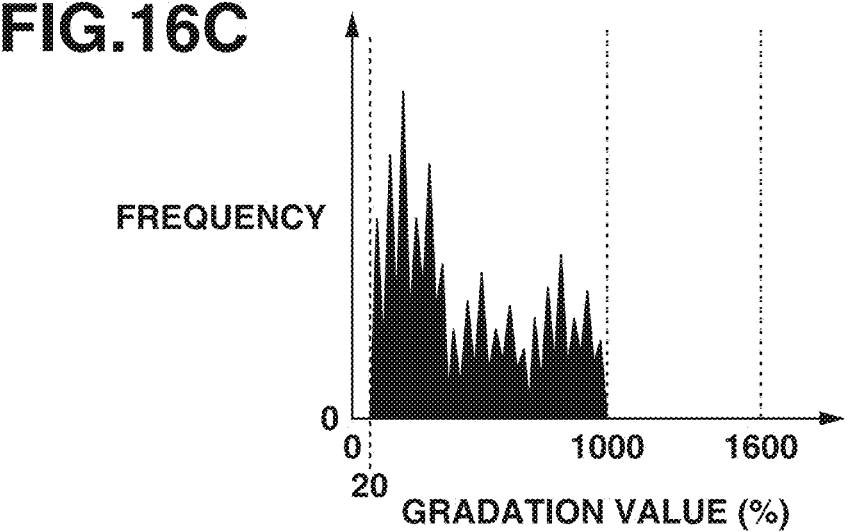
Figure 17A:
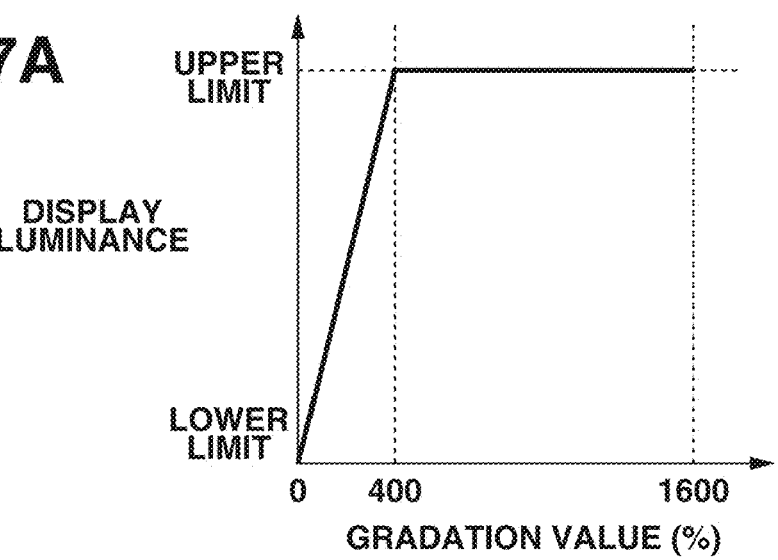
FIGS. 17A to 17C illustrate examples of correspondence relations between the gradation value of input image data and the display luminance of a liquid crystal panel according to the third exemplary embodiment.
Figure 17B:
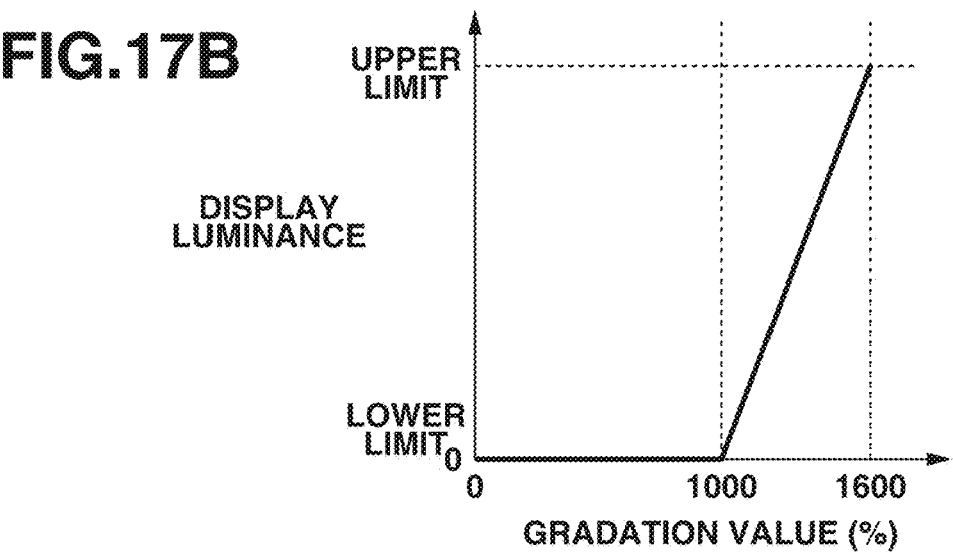
Figure 17C:
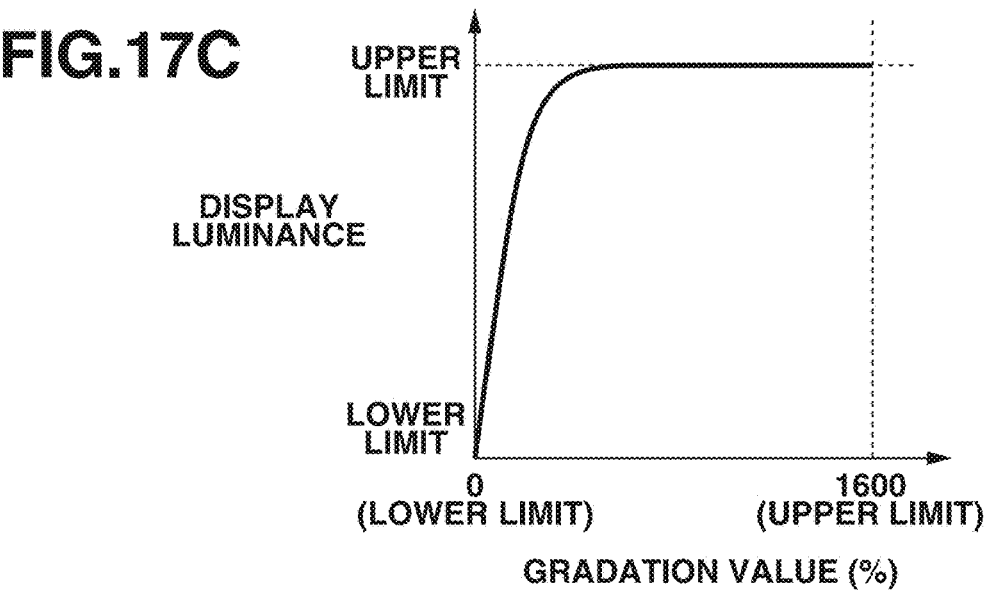

FIGS. 16A to 16C illustrate examples of frequency distributions (frequency distributions of the Y value) determined by the gradation distribution determination unit 1001. FIGS. 17A to 17C illustrate examples of correspondence relations (correspondence relations between the gradation value of the input image data and the display luminance of the liquid crystal display unit 105) when the enlargement display mode is set.

The correspondence relation illustrated in FIG. 17A corresponds to the third gradation conversion processing. In the frequency distribution illustrated in FIG. 16A, the minimum gradation value with a frequency of 1 or higher is 0% and the maximum gradation value with a frequency of 1 or higher is 400%. Thus, the width of the gradation range detected by the upper and lower limits determination unit 1002 is 400% which is smaller than the second threshold value 600%. In this case, the third gradation conversion processing for obtaining the correspondence relation illustrated in FIG. 17A is performed. In the correspondence relation illustrated in FIG. 17A, the lower limit 0% of the detected gradation range is associated with the lower limit of the display luminance, and the upper limit 400% of the detected gradation range is associated with the upper limit of the display luminance. The display luminance of the liquid crystal display unit 105 linearly increases from the lower limit to the upper limit with increasing gradation value of the input image data (from 0% to 400%).

The correspondence relation illustrated in FIG. 17B corresponds to the third gradation conversion processing. In the frequency distribution illustrated in FIG. 16B, the minimum gradation value with a frequency of 1 or higher is 1,000% and the maximum gradation value with a frequency of 1 or higher is 1,600%. Therefore, the width of the gradation range detected by the upper and lower limits determination unit 1002 becomes 600% which equals the second threshold value. In this case, the third gradation conversion processing for obtaining the correspondence relation illustrated in FIG. 17B is performed. In the correspondence relation illustrated in FIG. 17B, the lower limit 1,000% of the detected gradation range is associated with the lower limit of the display luminance, and the upper limit 1,600% of the detected gradation range is associated with the upper limit of the display luminance. The display luminance of the liquid crystal display unit 105 linearly increases from the lower limit to the upper limit with increasing gradation value of the input image data (from 1,000% to 1,600%).

The correspondence relation illustrated in FIG. 17C corresponds to a case where the setting of the HDR assist mode is canceled. More specifically, the correspondence relation illustrated in FIG. 17C corresponds to the second gradation conversion processing. In the frequency distribution illustrated in FIG. 16C, the minimum gradation value with a frequency of 1 or higher is 20% and the maximum gradation value with a frequency of 1 or higher is 1,000%. Therefore, the width of the gradation range detected by the upper and lower limits determination unit 1002 will be 980% which is larger than the second threshold value 600%. In this case, the setting of the HDR assist mode is canceled and the correspondence relation illustrated in FIG. 17C is obtained. More specifically, the setting of the HDR assist mode is canceled and the second gradation conversion processing for obtaining the correspondence relation illustrated in FIG. 17C is performed. The correspondence relation illustrated in FIG. 17C is equivalent to the correspondence relation illustrated in FIG. 7A.

Figure 15:
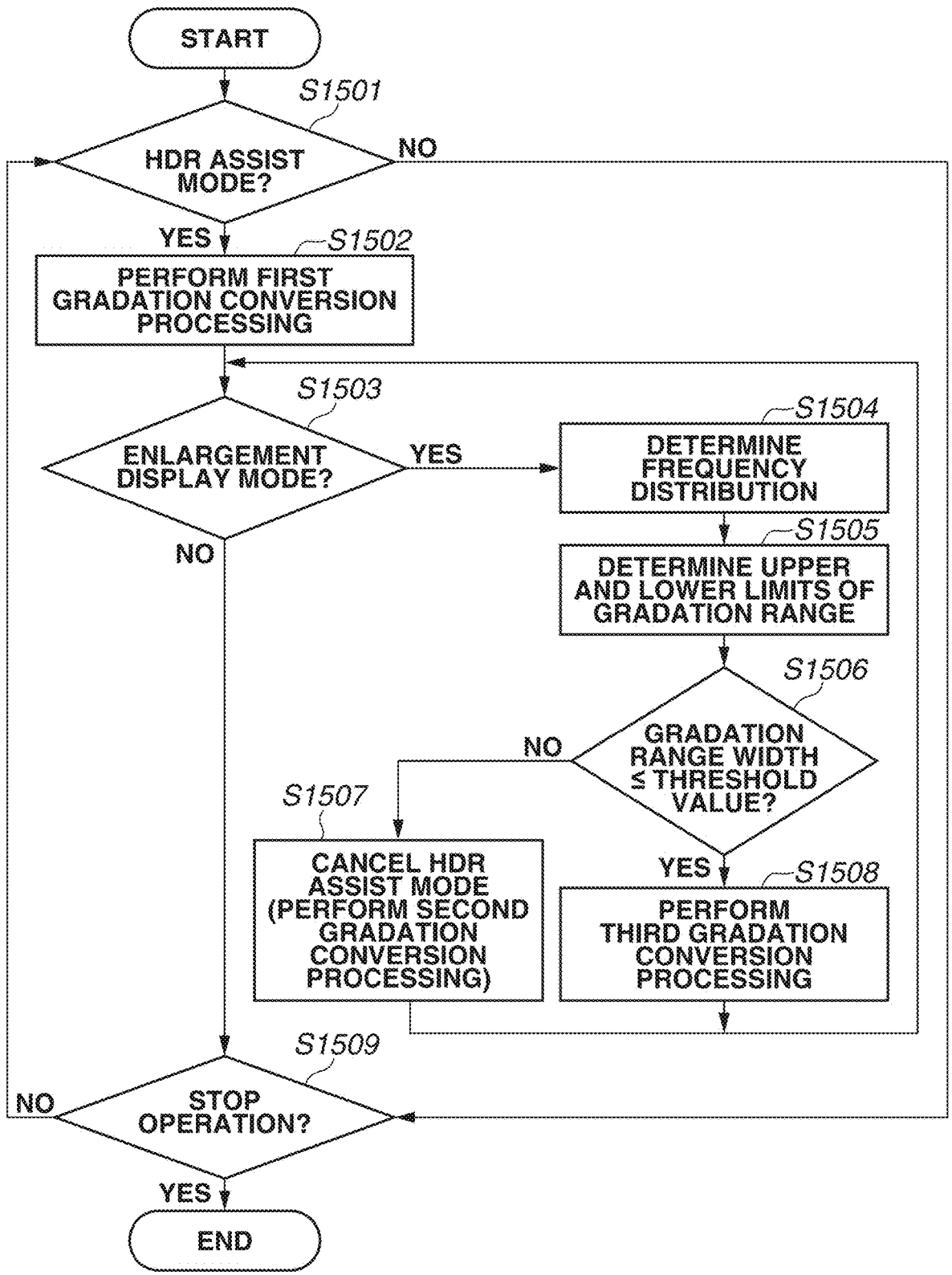
FIG. 15 is an example of a flowchart illustrating processing according to the third exemplary embodiment.

An example of a processing flow of the imaging apparatus according to the present exemplary embodiment will be described below with reference to FIG. 15. FIG. 15 is an example of a flowchart illustrating processing of the imaging apparatus according to the present exemplary embodiment. Processing in steps S1501 to S1505 is similar to the processing in steps S1101 to S1105 according to the second exemplary embodiment (FIG. 11). Processing in step S1509 is similar to the processing in step S1107 according to the second exemplary embodiment.

After the processing in step S1505, the processing in step S1506 is performed. In step S1506, the gradation range determination unit 1401 determines whether the width of the gradation range detected in step S1505 (the range from the lower limit detected in step S1505 to the upper limit detected in step S1505) is the second threshold value or below. When the width of the gradation range is larger than the second threshold value (NO in step S1506), the processing proceeds to step S1507. Meanwhile, when the width of the gradation range is the second threshold value or below (YES in step S1506), the processing proceeds to step S1508.

Processing in step S1507 is similar to the processing in step S804 according to the first exemplary embodiment (FIG. 8). Therefore, when the width of the gradation range is larger than the second threshold value, the setting of the HDR assist mode is canceled. Processing in step S1508 is similar to the processing in step S1106 according to the second exemplary embodiment. Thus, when the width of the gradation range is the second threshold value or below, the third gradation conversion processing is performed. The setting of the HDR assist mode is canceled. After either one of the processing in step S1507 and the processing in step S1508 is performed, the processing returns to step S1503.

As described above, according to the present exemplary embodiment, when the setting of the enlargement display mode is set in a state where the HDR assist mode is set and the width of the detected gradation range is the second threshold value or below, the third gradation conversion processing is performed. Then, when the enlargement display is set in a state where the HDR assist mode is set and the width of the detected gradation range is larger than the second threshold value, the setting of the HDR assist mode is canceled. Thus, more desirable display can be obtained when the enlargement display mode is set.

There is an imaging apparatus having the Manual Focus (MF) enlargement display mode in addition to the normal enlargement display mode. Such an imaging apparatus, for example, shifts to the normal enlargement display mode when the user presses the +(plus) button on the main body of the imaging apparatus, and shifts to the non-enlargement display mode from the enlargement display mode when the user presses the − (minus) button. With the MF enlargement display mode set to ON, when the user performs a manual focus adjustment operation by turning the focus ring, enlargement display processing is performed and, after a fixed time period has elapsed, the enlargement display processing is canceled. In the case of an imaging apparatus having the MF enlargement display mode, the "enlargement display mode" according to the first to the third exemplary embodiments may be replaced with the "enlargement display processing by the MF enlargement display mode" and may be applied. More specifically, when the MF enlargement display mode is set to ON and the user performs a manual focus adjustment operation, the enlargement display processing is automatically performed for a fixed time period, and then the second or the third gradation conversion processing may be performed. In this case, the first gradation conversion processing is performed in the normal enlargement display mode. Since the normal enlargement display mode may be performed for an application other than focus confirmation, for example, to confirm whether a target subject photo opportunity exists. However, the MF enlargement display mode is a mode in which the enlargement display processing is performed to allow the user to easily perform focus confirmation when the user performs manual focus adjustment by turning the focus ring. Therefore, performing the second or the third gradation conversion processing only when performing "the enlargement display processing in the MF enlargement display mode" enables the gradation conversion processing to be suitably switched between a case where focus confirmation is performed and other cases.

Each function unit according to the first to the third exemplary embodiments may or may not be individual hardware. Functions of a plurality of function units may be implemented by common hardware. Each of a plurality of functions of one function unit may be implemented by individual hardware. Two or more functions of one function unit may be implemented by common hardware. Further, each function unit may or may not be implemented by hardware. For example, the apparatus may include a processor and a memory storing a control program. Functions of at least some of function units included in the apparatus may be implemented when the processor reads a control program from the memory.

The first to the third exemplary embodiments are to be considered as examples, and a configuration obtained by suitably transforming or modifying the configurations of the first to the third exemplary embodiments within the scope of the appended claims of the present invention is also included in the present invention. A configuration obtained by suitably combining the configurations of the first to the third exemplary embodiments is also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-168274, filed Aug. 30, 2016, and No. 2017-120174, filed Jun. 20, 2017, which are hereby incorporated by reference herein in their entirety.

What is claimed is:

1. An image processing apparatus comprising:
a setting unit configured to set at least one of a plurality of display modes including a first display mode and a second display mode; and
a processing unit configured to perform first gradation conversion processing on input image data when the first display mode is set, and to perform second gradation conversion processing on the input image data when the second display mode is set,
wherein the second gradation conversion processing improves a gradation in at least a part of a range on a low gradation side of input gradation values to a further extent than the first gradation conversion processing and, converts, in at least a part of a range on a high gradation side of the input gradation values, an input gradation value in such a manner that an output gradation value becomes an upper limit, and
wherein, upon reception of an instruction for displaying an enlarged image of a part of an image region of the input image data in a state where the first display mode is set, the setting unit cancels the first display mode and sets the second display mode.

2. The image processing apparatus according to claim 1, wherein the first display mode is a display mode for a user to confirm a gradation of an entire gradation range of the input image data.

3. The image processing apparatus according to claim 1, wherein the first gradation conversion processing is processing for converting each gradation value of the input image data in such a manner that a lower limit of a gradation value of the input image data corresponds to a lower limit of a display luminance of a display unit, and an upper limit of the gradation value of the input image data corresponds to an upper limit of the display luminance of the display unit.

4. The image processing apparatus according to claim 1, wherein the first gradation conversion processing is gradation conversion processing corresponding to inverse characteristics of gradation characteristics provided by a display panel.

5. The image processing apparatus according to claim 1, wherein the first gradation conversion processing is gradation conversion processing for improving a gradation in a range on a high gradation side of an input gradation value compared to a range on an intermediate gradation or a range on a low gradation side of the input gradation value.

6. The image processing apparatus according to claim 1, wherein the second display mode is a mode for displaying an image with a display luminance higher than the display luminance in the first display mode.

7. The image processing apparatus according to claim 1, wherein the second gradation conversion processing is gradation conversion processing for improving a gradation in a range on a low gradation side of an input gradation value compared to a range on an intermediate gradation or a range on a high gradation side of the input gradation value.

8. The image processing apparatus according to claim 1, further comprising
a detection unit configured to detect a range of a gradation value in which the number of pixels existing in the part of the image region of the input image data is a first threshold value or above,
wherein, when the second display mode is set, the processing unit performs third gradation conversion processing on the input image data as the second gradation conversion processing, the third gradation conversion processing being for reducing degradation in gradation of the input image data in the range detected by the detection unit and displaying an image based on the input image data on a display unit.

9. The image processing apparatus according to claim 8, wherein the processing unit performs:
the third gradation conversion processing on the input image data when the second display mode is set and a width of the range detected by the detection unit is a second threshold value or below, and
the second gradation conversion processing on the input image data when the second display mode is set and a width of the range detected by the detection unit is larger than the second threshold value.

10. The image processing apparatus according to claim 8, wherein the third gradation conversion processing is processing for converting each gradation value of the input image data in such a manner that a lower limit of the range detected by the detection unit corresponds to a lower limit of a display luminance of a display unit, and an upper limit of the range detected by the detection unit corresponds to an upper limit of the display luminance of the display unit.

11. The image processing apparatus according to claim 8, wherein the third gradation conversion processing is processing for converting each gradation value of the input image data in such a manner that a lower limit of a gradation value of the input image data corresponds to a lower limit of a display luminance of a display unit, and an upper limit of the range detected by the detection unit corresponds to an upper limit of the display luminance of the display unit.

12. An imaging apparatus comprising:
the image processing apparatus according to claim 1; and
an imaging unit configured to convert an optical image of a subject into an image signal.

13. A display apparatus comprising:
the image processing apparatus according to claim 1; and
a display unit configured to display an image based on the input image data.

14. An image processing method comprising:
setting at least one of a plurality of display modes including a first display mode and a second display mode; and
performing first gradation conversion processing on input image data when the first display mode is set, and to perform second gradation conversion processing on the input image data when the second display mode is set, wherein the second gradation conversion processing improves a gradation in at least a part of a range on a low gradation side of input gradation values to a further extent than the first gradation conversion processing and, converts, in at least a part of a range on a high gradation side of the input gradation values, an input gradation value in such a manner that an output gradation value becomes an upper limit, and wherein, upon reception of an instruction for displaying an enlarged image of a part of an image region of the input image data in a state where the first display mode is set, the first display mode is canceled and the second display mode is set.

15. A non-transitory computer-readable recording medium storing a program for causing a computer to execute each step of an image processing method comprising:

setting at least one of a plurality of display modes including a first display mode and a second display mode; and performing first gradation conversion processing on input image data when the first display mode is set, and to perform second gradation conversion processing on the input image data when the second display mode is set, wherein the second gradation conversion processing improves a gradation in at least a part of a range on a low gradation side of input gradation values to a further extent than the first gradation conversion processing and, converts, in at least a part of a range on a high gradation side of the input gradation values, an input gradation value in such a manner that an output gradation value becomes an upper limit, and wherein, upon reception of an instruction for displaying an enlarged image of a part of an image region of the input image data in a state where the first display mode is set, the first display mode is canceled and the second display mode is set.

* * * * *